(12) United States Patent
Wu et al.

(10) Patent No.: US 10,869,340 B2
(45) Date of Patent: Dec. 15, 2020

(54) SLOW-LOOP RESOURCE RESERVATION PROCEDURE

(71) Applicant: QUALCOMM Incorporated, San Diego, CA (US)

(72) Inventors: Zhibin Wu, Sunnyvale, CA (US); Navid Abedini, Somerset, NJ (US); Junyi Li, Chester, NJ (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 16/379,655

(22) Filed: Apr. 9, 2019

(65) Prior Publication Data

US 2019/0320461 A1    Oct. 17, 2019

Related U.S. Application Data

(60) Provisional application No. 62/657,512, filed on Apr. 13, 2018.

(51) Int. Cl.
*H04W 76/14* (2018.01)
*H04B 7/06* (2006.01)
*H04W 74/08* (2009.01)
*H04W 76/15* (2018.01)
*H04W 72/04* (2009.01)
*H04W 72/12* (2009.01)

(52) U.S. Cl.
CPC ........ *H04W 74/085* (2013.01); *H04B 7/0617* (2013.01); *H04W 72/046* (2013.01); *H04W 72/121* (2013.01); *H04W 76/14* (2018.02); *H04W 76/15* (2018.02)

(58) Field of Classification Search
CPC .......................... H04W 76/14; H04W 74/085
See application file for complete search history.

(56) References Cited

U.S. PATENT DOCUMENTS

2009/0034491 A1    2/2009 Adams et al.

OTHER PUBLICATIONS

International Search Report and Written Opinion—PCT/US2019/026968—ISA/EPO—dated May 24, 2019.

*Primary Examiner* — Angel T Brockman
(74) *Attorney, Agent, or Firm* — Arent Fox LLP

(57) ABSTRACT

In an aspect of the disclosure, a method, a computer-readable medium, and an apparatus are provided. The apparatus may determine a preferred beamforming direction for communications with each of a plurality of neighbor UEs. The apparatus may transmit a first scheduling request to a second UE from among the plurality of neighbor UEs. In certain aspects, the first scheduling request may include a first transmission schedule for M transmission opportunities (TxOPs). In certain other aspects, the first transmission schedule may indicate a first set of TxOPs of the M TxOPs reserved by the first UE for communication with the second UE. The apparatus may receive a first scheduling response from the second UE, the first scheduling response indicating whether the second UE accepts or rejects the first scheduling request.

27 Claims, 13 Drawing Sheets

SLOW-LOOP RESOURCE RESERVATION PROCEDURE

CROSS-REFERENCE TO RELATED APPLICATION(S)

This application claims the benefit of U.S. Provisional Application Ser. No. 62/657,512, entitled "Slow-Loop Resource Reservation Procedure" and filed on Apr. 13, 2018, which is expressly incorporated by reference herein in its entirety.

BACKGROUND

Technical Field

The present disclosure relates generally to communication systems, and more particularly, to a resource reservation procedure.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may determine a preferred beamforming direction for communications with each of a plurality of neighbor UEs. The apparatus may transmit a first scheduling request to a second UE from among the plurality of neighbor UEs. In certain aspects, the first scheduling request may include a first transmission schedule for a plurality of transmission opportunities (TxOPs). In certain other aspects, the first transmission schedule may indicate a first set of TxOPs of the plurality of TxOPs reserved by the first UE for communication with the second UE. The apparatus may receive a first scheduling response from the second UE, the first scheduling response indicating whether the second UE accepts or rejects the first scheduling request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
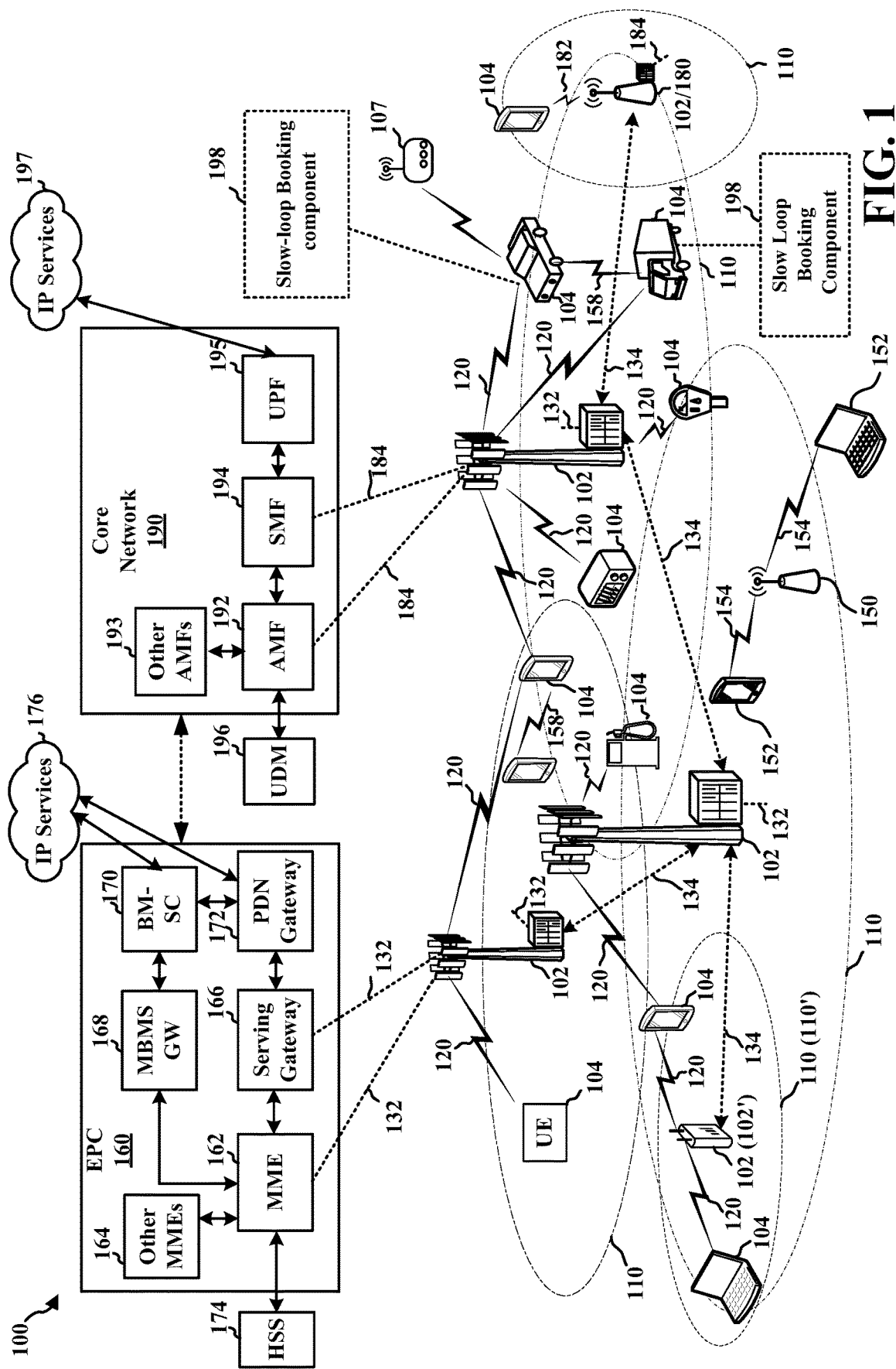
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming for a signal 182 with the UE 104 to compensate for the extremely high path loss and short range.

Figure 4:
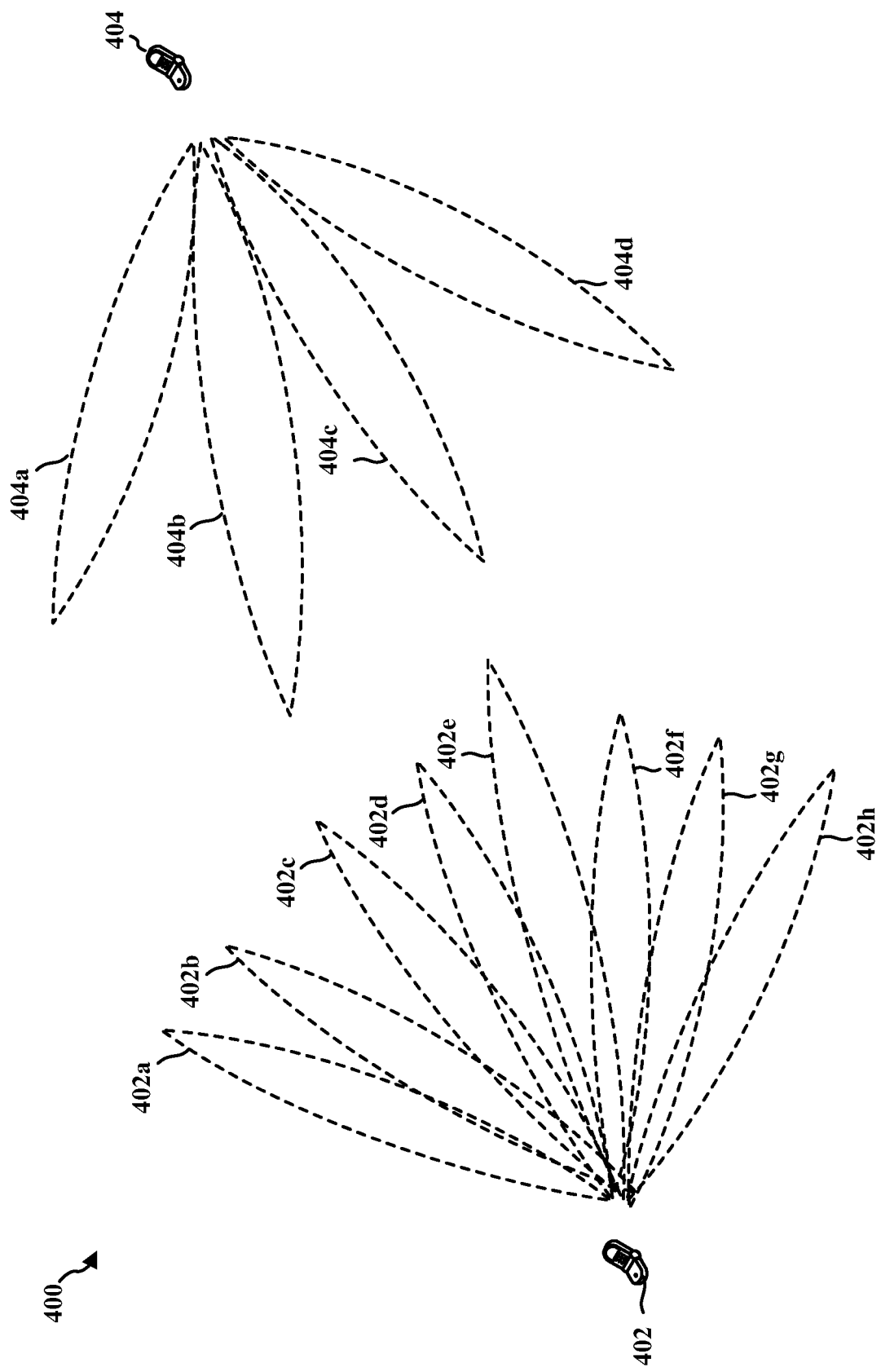
FIG. 4 is a diagram illustrating two devices communicating using beamforming.

The base station 180 may transmit a beamformed signal to the UE 104 in one or more transmit directions, e.g., as illustrated in FIG. 4. The UE 104 may receive the beamformed signal from the base station 180 in one or more receive directions. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104, e.g., a transmitting Vehicle User Equipment (VUE) or other UE, may be configured to transmit messages directly to another UE 104, e.g., UE. The communication may be based on V2V/V2X or other D2D communication, such as Proximity Services (ProSe). Communication based on V2V, V2X, and/or D2D may also be transmitted and received by other transmitting and receiving devices, such as Road Side Unit (RSU) 107, etc. Aspects of the communication may be based on PC5 or sidelink communication.

One way to meet the increasing demand for mobile broadband may be to utilize the millimeter wave (mmW) spectrum in addition to LTE. However, communications using the mmW radio frequency band have extremely high path loss and a short range. Beamforming may be used to compensate for the extremely high path loss and short range. Beamforming techniques and methods are currently needed for providing seamless and continuous coverage for devices operating in the mmW radio frequency band.

Referring again to FIG. 1, in certain aspects, the UE 104 may comprise a slow loop booking component 198 configured to perform a slow-loop resource reservation procedure, e.g., including any of the aspects described in connection with FIGS. 2-8. Although described with a focus on a UE, aspects may also be employed by other devices engaged in V2X/V2V/D2D communication, such as an RSU 107 or base station 102/180 communicating using sidelink.

Figure 2:
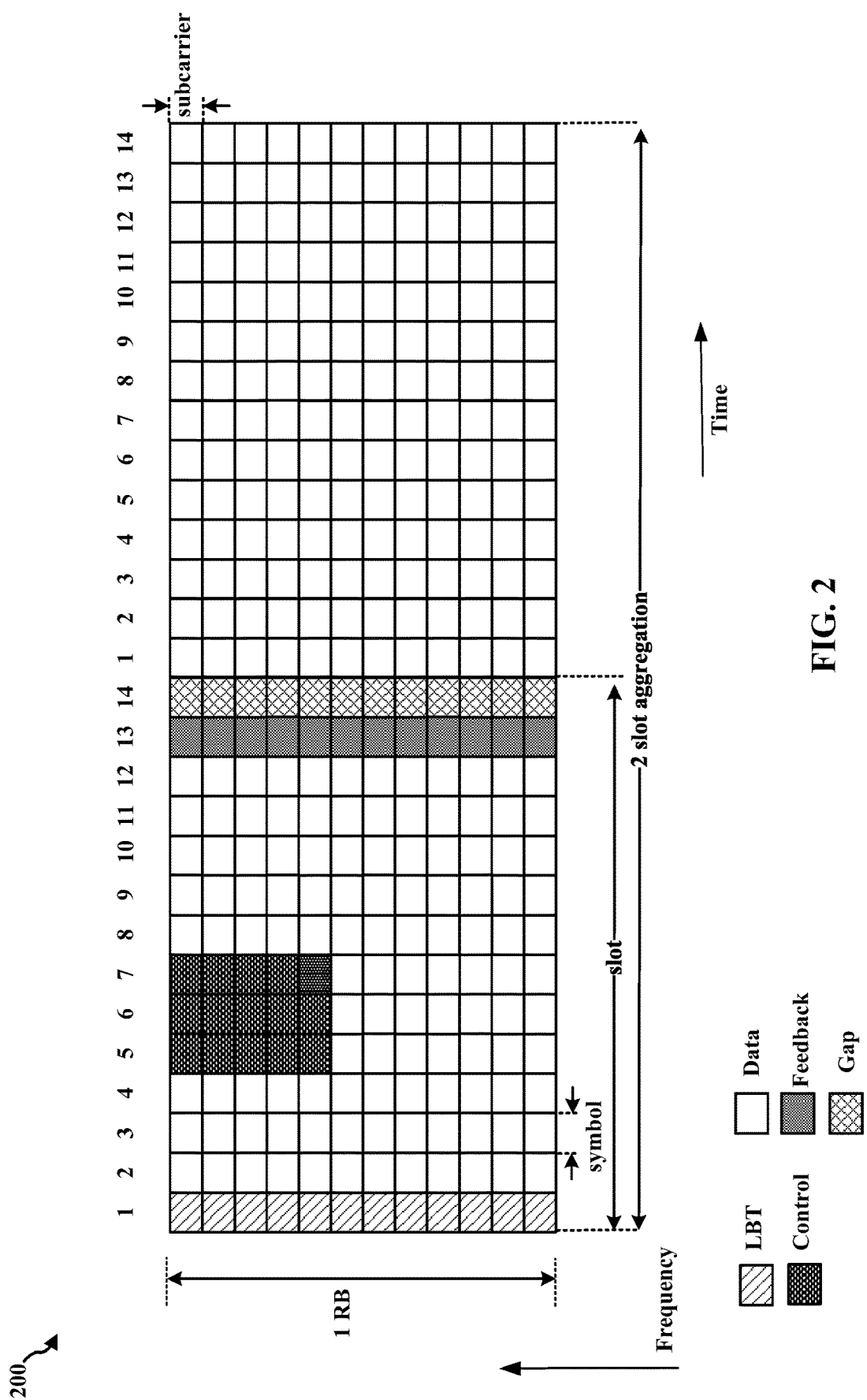
FIG. 2 illustrates an example of a sidelink slot structure.

FIG. 2 is a diagram 200 illustrating an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. A slot may be referred to as or include one or more transmission time intervals (TTIs), and may vary in length based on sub carrier spacing (SCS) or other configuration. Subframes may also include mini-slots, which may include 7, 4, or 2 symbols. Each slot may include 7 or 14 symbols, depending on the slot configuration. For slot configuration 0 each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with Demodulation Reference Signal (DM-RS). The control information may comprise Sidelink Control Information (SCI). At least one symbol at the beginning of a slot may be used by a transmitting device to perform a Listen Before Talk (LBT) operation prior to transmitting. At least one symbol may be used for feedback, as described herein. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 illustrates an example aggregation of two slot. The aggregated number of slots may also be larger than two. When slots are aggregated, the symbols used for feedback and/or a gap symbol may be different that for a single slot.

Figure 3:
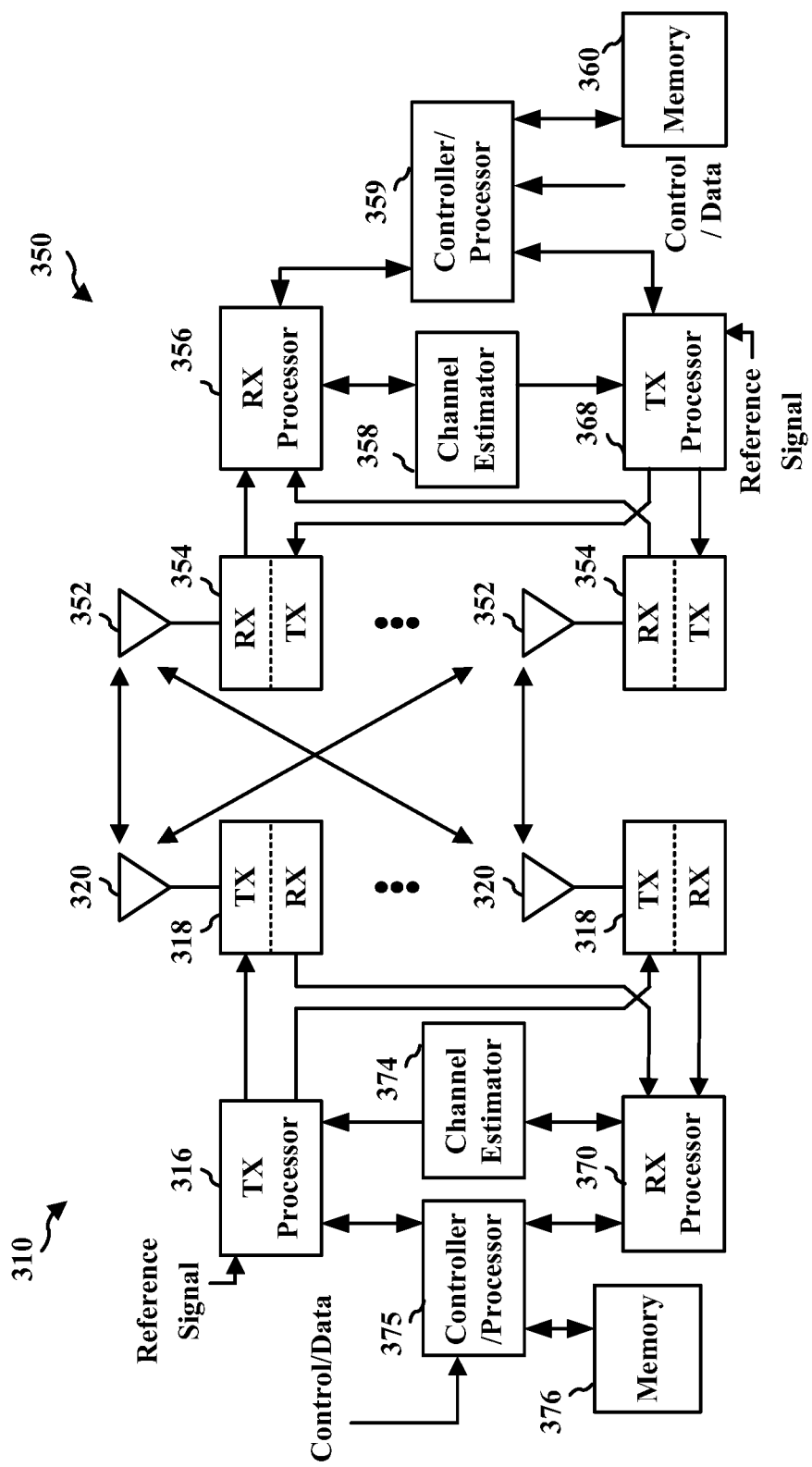
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device 350 may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

FIG. 4 is a diagram 400 illustrating a first wireless node 402 in communication with a second wireless node 404. Referring to FIG. 4, the first wireless node 402 may transmit a beamformed signal to the second wireless node 404 in one or more of the directions 402a, 402b, 402c, 402d, 402e, 402f, 402g, 402h. The second wireless node 404 may receive the beamformed signal from the first wireless node 402 in one or more receive directions 404a, 404b, 404c, 404d. The second wireless node 404 may also transmit a beamformed signal to the first wireless node 402 in one or more of the directions 404a-404d. The first wireless node 402 may receive the beamformed signal from the second wireless node 404 in one or more of the receive directions 402a-402h. The first wireless node 402/second wireless node 404 may perform beam training to determine the best receive and transmit directions for each of the first wireless node 402/ second wireless node 404. The transmit and receive directions for the first wireless node 402 may or may not be the same. The transmit and receive directions for the second wireless node 404 may or may not be the same.

Antennas located at a wireless node (e.g., UE, base station, RSU, vehicle, etc.) may provide a wireless network with various properties that include, among others, gain and direction. Gain may be a measure of an increase in energy that an antenna adds to an RF signal that is transmitted by a wireless node. Direction may be the shape of the transmission pattern. Generally, wireless nodes that communicate using the mmW frequency spectrum network may either include omnidirectional antennas or directional antennas.

An omnidirectional antenna may be used to transmit a signal that has energy distributed in all directions rather than energy focused in the direction of the receiving node. Due to the omnidirectional nature of transmissions using an omnidirectional antenna, network capacity may be limited. For example, the distribution of energy in all directions may create unnecessary interference to neighbor nodes, and may decrease the range of transmissions.

With directional communications (e.g., using a directional antenna), both range and spatial reuse may be increased (as compared to omnidirectional communications) by having wireless nodes focus transmitted energy only in the direction of the receiving node. At the receiving node, directional antennas may selectively receive signals from a desired direction, thereby increasing the signal to interference to noise ratio (SINR). Hence, the use of directional antennas may be desirable for communications using the mmW frequency spectrum in order to compensate for the extremely high path loss and short range.

When communicating in the mmW frequency spectrum, a wireless node may perform a Ready-to-Send (RTS)/Clear-to-Send (CTS) procedure with one or more neighbor nodes in order to schedule one or more transmission opportunities (TxOPs) that do not conflict with the transmission schedule of neighbor nodes.

Because omnidirectional antennas may sense any potential scheduling conflicts (e.g., RTS/CTS procedure performed by one or more neighbor node contending for the same TxOP) in all directions, scheduling conflicts may be avoided. However, because directional antennas may only sense potential scheduling conflicts in a particular beamformed direction, scheduling conflicts may occur with neighbor nodes that are beamformed in different directions or are out of range, e.g., as described below in connection with FIG. 5A.

Figure 5A:
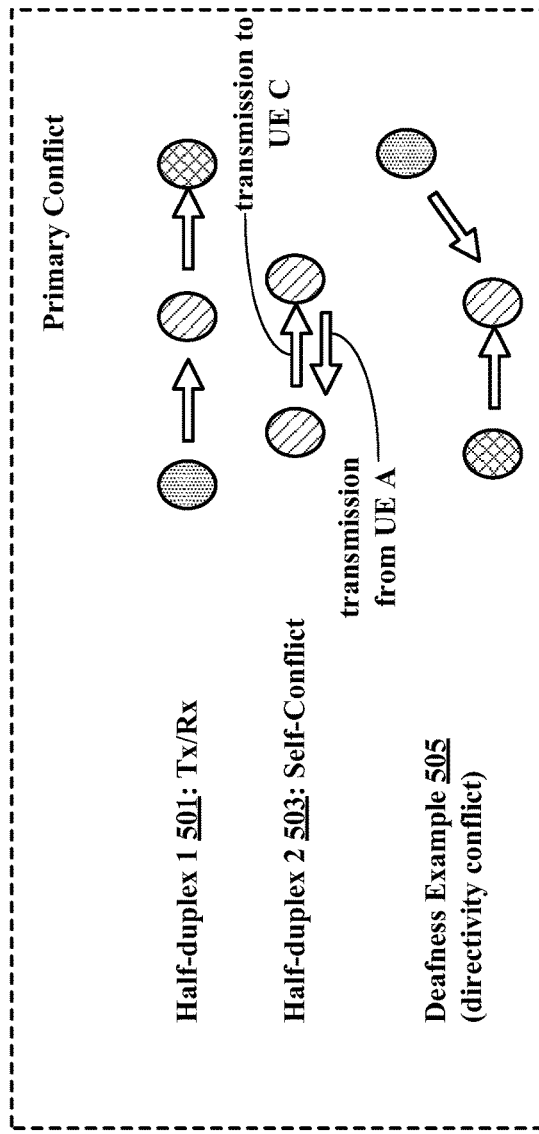
FIG. 5A is a diagram illustrating potential conflicts that may occur with the use of directional antennas in accordance with certain aspects of the disclosure.
Figure 5A:
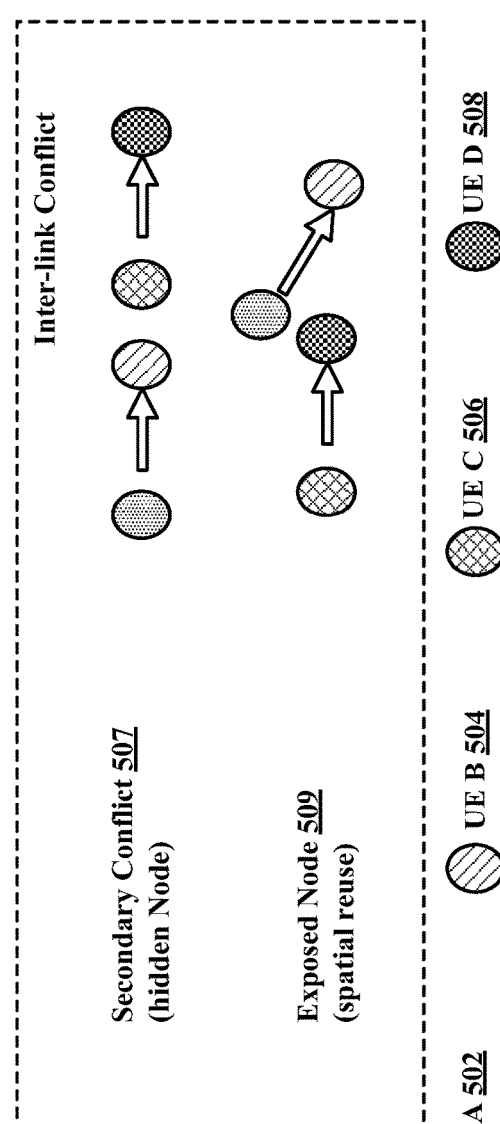

FIG. 5A is a diagram illustrating primary conflicts 500 and inter-link conflicts 515 that may be caused by directional antennas in accordance with certain aspects of the disclosure. For example, the example primary conflicts 500 may include a first half-duplex conflict 501, a second half-duplex conflict 503, and/or a deafness challenge 505. The inter-link conflicts 515 may include, for example, a secondary conflict 507 (e.g., hidden node conflict) and/or an exposed node challenge 509 (e.g., spatial reuse conflict).

The first half-duplex conflict 501 may arise because directional antennas may be unable to concurrently send transmission to a UE while receiving from a different UE when the UEs are not collocated. For example, UE A 502 may transmit data to UE B 504 using a same TxOP that UE B 504 uses to transmit data to UE C 506. However, because UE B 504 is communicating in the opposite direction with UE C 506, UE B 504 may miss data concurrently transmitted by UE A 502. This may occur because directional antennas at UE B 504 may, in some cases, either be focused in the direction of UE A 502 or the direction of UE C 506, but not both directions at the same time.

Another half-duplex conflict 503 may involve UE B's 504 inability to concurrently send and receive data because directional antennas at UE B 504 may either be focused in the direction of UE A 502 or the direction of UE C 506, but not both directions. This conflict may be referred to as a self-conflict, because the conflict arises at a single device.

The deafness issue 505 may occur because UE B 504 might not be able to receive two different directional beams at the same time, e.g., from UE A 502 and UE C 506. Thus, UE A 502 may be unable to communicate with UE B 504 when UE B 504 is beamformed in the direction of UE C 506. In such an event, UE A 502 may perceive UE B 504 as having moved out of range, which may decrease the network throughput.

An example secondary conflict 507 may occur when communication from UE A 502 with UE B 504 causes interference to communication between UE C 506 and UE D 508. UE A 502 may be unaware of UE C 506 and/or UE D 508 because UE A 502 is out of range of these two UEs. When UEs are hidden and concurrent transmissions occur, UE A 502 may cause interference to UE C 506 and/or UE D 508 because the signal transmitted by UE A 502 propagates towards the direction of UE C 506 and/or UE D 508.

An exposed node conflict 509 may arise when, for example, UE A 502 has data to send to UE B 504 using a TxOP in a beamforming direction that does not interfere with a concurrent transmission between UE C 506 and UE D 508. However, because the network senses that UE C 506 has reserved the TxOP, UE A 502 may be forced to unnecessarily delay its transmission until a subsequent TxOP in which UE C 506 is not transmitting. The exposed node conflict 509 may limit communication despite of the fact that UE A 502 could transmit data to UE B 504 without causing interference, UE A 502 may be instructed to defer its transmission until sensing that the TxOP is unused, thereby reducing the spatial reuse of the network.

In order to sense potential scheduling conflicts in all directions (e.g., to determine if neighbor nodes are performing an RTS/CTS procedure for the same TxOP or are transmitting in the same TxOP), a wireless node using a directional antenna may perform a beam scanning procedure for all beams, which may require an undesirable amount power and increase the latency of the network. The present disclosure provides a solution to the challenges described above in connection with FIG. 5A using a TxOP reservation procedure (e.g., a slow-loop reservation procedure), e.g., as described below in connection with any of FIGS. 5B-8.

Figure 5B:
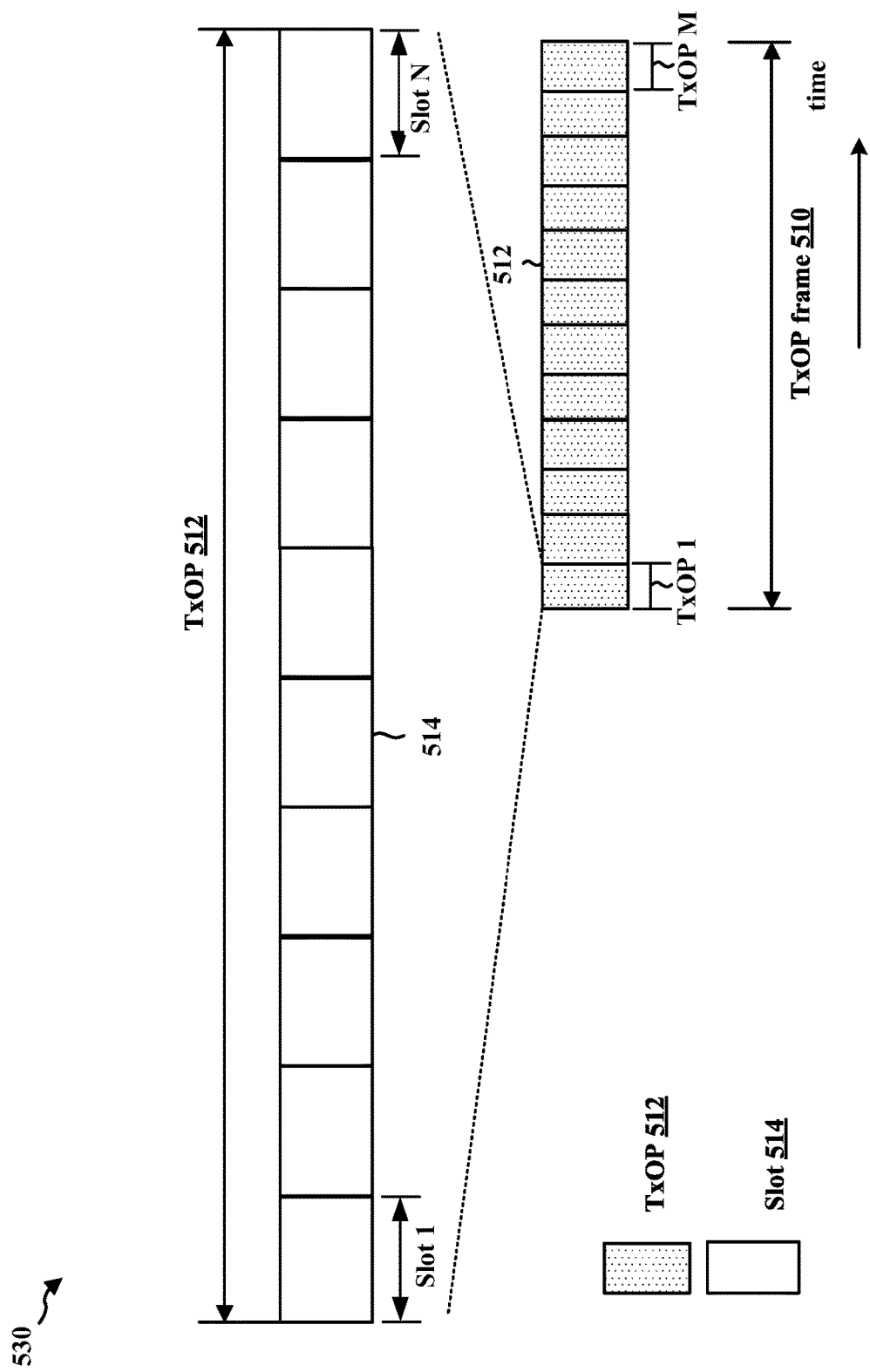
FIG. 5B is a diagram illustrating an example transmission opportunity (TxOP) frame in accordance with certain aspects of the present disclosure.

FIG. 5B is a diagram 530 illustrating an example TxOP frame 510 in accordance with certain aspects of the present disclosure. The TxOP frame 510 may include M TxOPs 512, and each TxOP 512 may include N slots. In the example illustrated in FIG. 5B, the TxOP frame 510 includes twelve TxOPs 512 (e.g., M=12), each TxOP having ten slots 516 (e.g., N=10). The example number of TxOPs in a TxOP frame, as well as the number of slots within a TxOP are merely examples to illustrate the principle. The number of TxOPs 512 per TxOP frame 510 is not limited to twelve, and the number of slots 514 per TxOP 512 is not limited to ten. Instead, the number of TxOPs 512 per TxOP frame 510 may include more or fewer than twelve and the number of slots 514 per TxOP 512 may include more or fewer than ten without departing from the scope of the present disclosure.

Figure 5C:
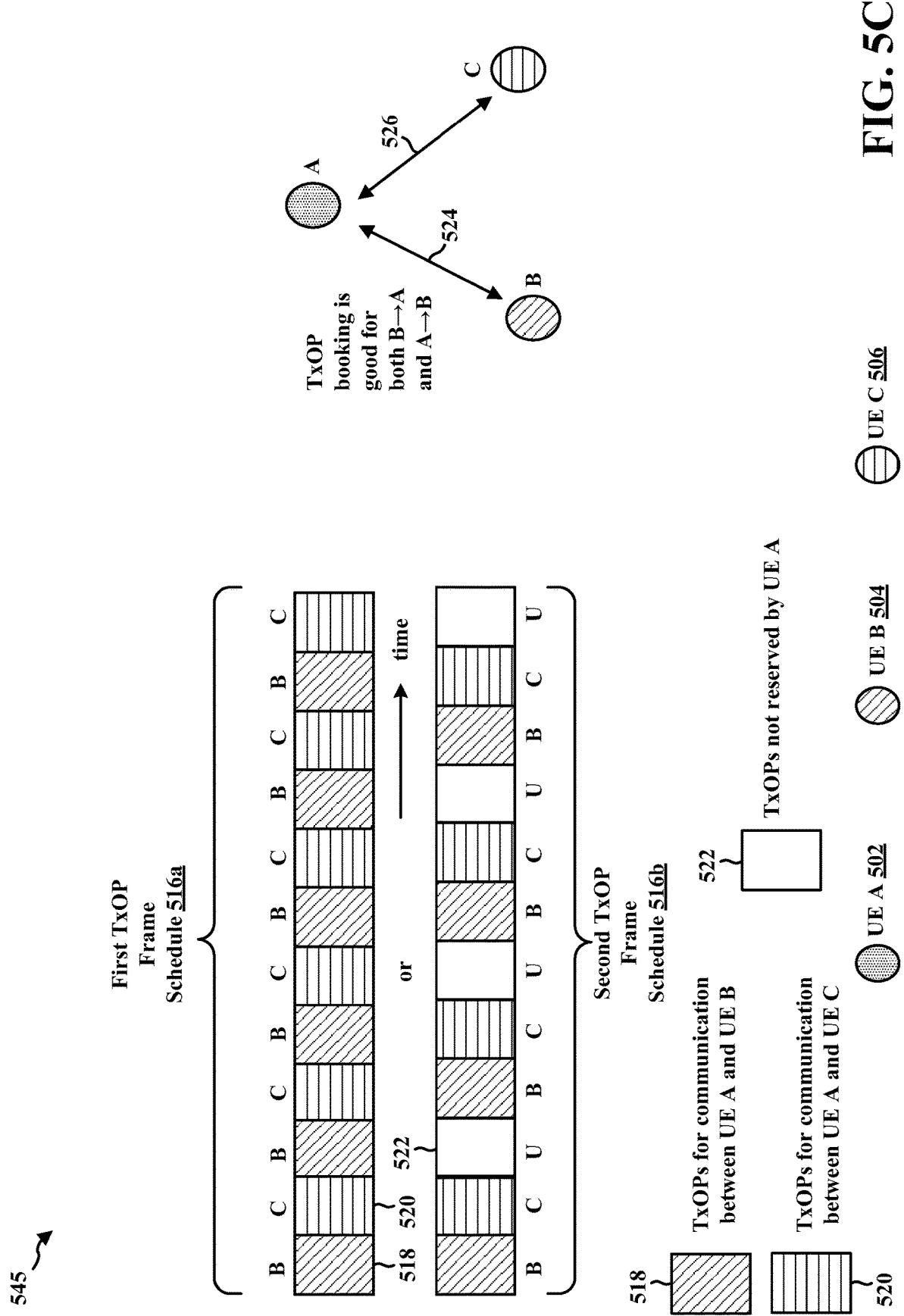
FIG. 5C is a diagram illustrating example TxOP frame schedules that may be used to reserve one or more TxOPs within a TxOP frame in accordance with certain aspects of the disclosure.

FIG. 5C is a diagram 545 illustrating two example TxOP frame schedules 516*a*, 516*b* that may be used to reserve one or more TxOPs within a TxOP frame in accordance with certain aspects of the disclosure. In certain implementations, the example TxOP frame schedules 516*a*, 516*b* may be used by a set of neighbor UEs 502, 504, 506 to overcome at least one of the conflicts 501, 503, 505, 507, 509 described above in connection with FIG. 5A.

Referring to FIG. 5C, the first example TxOP frame schedule 516*a* may be used by, e.g., UE A 502 to communicate with UE B 504 and UE C 506. The first example TxOP frame schedule 516*a* may include a first set of TxOPs 518 that are reserved for communications 524 between UE A 502 and UE B 504 in either the transmission direction from A to B or the opposite direction from B to A (e.g., a pairwise reservation between the UE A 502 and UE B 504), and a second set of TxOPs 520 that are reserved for communications 526 between UE A 502 and UE C 506 (e.g., a pairwise reservation between the UE A 502 and UE C 506).

The second example TxOP frame schedule 516*b* may be used by, e.g., UE A 502 to communicate with UE B 504 and UE C 506. The second example TxOP frame schedule 516*b* may include a first set of TxOPs 518 that are reserved for communications 524 between UE A 502 and UE B 504 (e.g., a pairwise reservation between the UE A 502 and UE B 504), a second set of TxOPs 520 that are reserved for communications 526 between UE A 502 and UE C 506 (e.g., a pairwise reservation between the UE A 502 and UE C 506), and a third set of TxOPs 522 that are not reserved by UE A 502, and hence, available for scheduling by other neighbor UEs.

Each of UE A 502, UE B 504, and UE C 506 may perform a random access channel (RACH) procedure (e.g., a 4-way handshake between two UEs) to discover neighboring UEs. A UE may perform a beam-scanning or beamforming procedure. For example, a UE may monitor for a signal or perform measurements of a signal on each of plurality of possible beam directions, e.g., sweeping a set of predefined reception beam directions, in order to attempt to detect a signal from another UE in one of those directions. The process may be referred to as beam-scanning. The UE may select a beam based on a detected signal or based on a measurement of the signal in a particular beam direction.

A random access procedure may involve one UE transmitting a first random access message comprising a random access preamble, e.g., indicating a selected beam direction. The beam direction may be selected based on the beam scanning/beamforming procedure. The UE may receive a second random access message from a second UE in response to the first message and acknowledging the random access preamble from the first UE. The first UE may send a third random access message, e.g., indicating one or more channel measurements and/or identifying the first UE. The first UE may receive a fourth random access message from the second UE acknowledging the third message. The first UE may transmit communication in response to receiving the fourth random access message from the second UE. While this example is described in connection with a 4 step RACH procedure, a different number of messages may be exchanged as part of the random access procedure. For example, a 2 step random access procedure may be performed in which the first and the third random access messages from the first UE are combined into message A and the second and fourth response messages from the second UE are combined into message B.

Once the RACH procedure(s) between a set of neighbor UEs is complete (on a one time or periodic basis), TxOP reservations in a TxOP frame may be negotiated between the set of neighbor UEs.

A TxOP frame schedule may be semi-static in that a set of neighbor UEs may use the TxOP frame schedule for the duration of multiple TxOP frames. However, if a TxOP reserved for communication between two UEs is unused for a threshold period (e.g., if neither UE has data to exchange), the set of neighbor UEs may renegotiate the TxOP frame schedule so that resources may be more efficiently utilized, and hence, the network throughput may be increased.

Figure 5D:
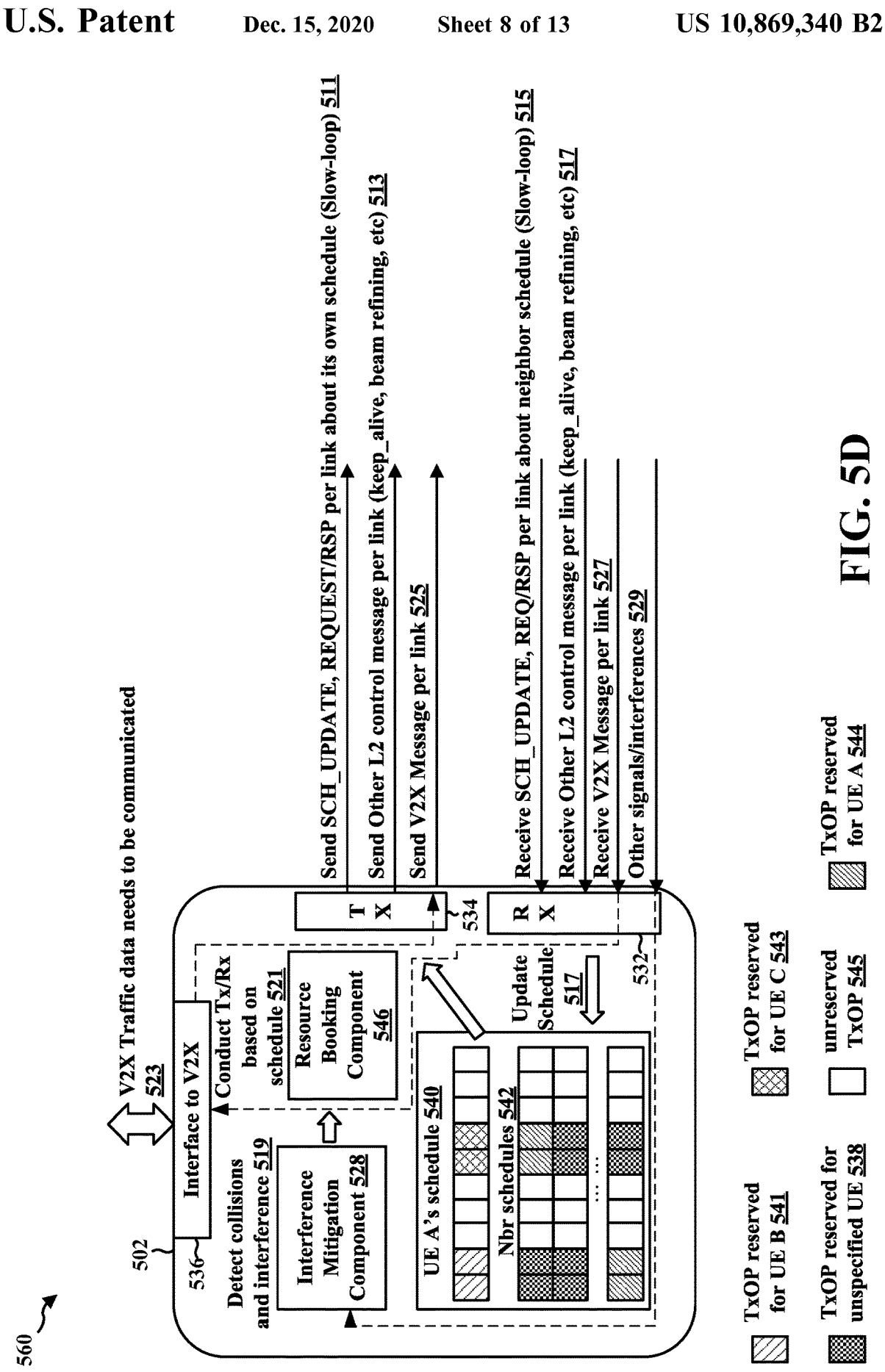
FIG. 5D is a data flow for a TxOP reservation procedure (e.g., a slow-loop reservation procedure) that may be performed by one or more devices in accordance with certain aspects of the present disclosure.

FIG. 5D is a data flow 560 for a TxOP reservation procedure (e.g., a slow-loop reservation procedure) that may be performed by UE A 502, UE B 504 (not illustrated in FIG.

5D), and/or UE C 506 (not illustrated in FIG. 5D) in accordance with certain aspects of the present disclosure. In certain implementations, UE A 502 may be unable to arbitrarily book TxOPs for communications with another UE because a scheduling conflict may arise when the same TxOP is reserved by another neighboring UE. Thus, UE A 502 may use the TxOP reservation procedure described below in order to avoid scheduling conflicts with neighbor UEs. UE A 502 may correspond to, e.g., the UE 104, 350, the apparatus 702/702'. UE A 502 may include an interference mitigation component 528, a resource booking component 546, a reception component 532, a transmission component 534, and a vehicle-to-everything (V2X) interface 536 for communications between a vehicle (e.g., when UE A is a vehicle) and another device.

In certain configurations, UE A 502 may perform a beamforming procedure with each of UE B 504 and UE C 506 to determine a preferred beamforming direction for communications with each of UE B 504 and UE C 506. For example, UE A 502 may perform the beamforming procedure as described above in connection with FIG. 4. In certain implementations, the reception component 532 and/or the transmission component 534 may perform the beamforming procedure by exchanging (at 513 and 517) L2 messages related to beamforming, e.g., such as beam refining messages (e.g., beam_refining message) and/or instructions (e.g., beam_alive message) to maintain a previously determined beamforming direction.

In certain implementations, a primary-secondary relationship between the first UE and one or more of the plurality of neighbor UEs may be established during the beamforming procedure. The primary-secondary relationship may be useful in scenarios in which a TxOP frame schedule cannot be agreed upon by two or more UEs. For example, when UE A 502 is the primary UE, and an agreement cannot be reached with a secondary UE with respect to a TxOP frame schedule, UE A 502 may select the TxOP frame schedule that will be used by UE A 502 and the secondary UE. In certain implementations, the primary-secondary relationship may be negotiated and/or determined during the 4-way handshake RACH procedure performed to discover neighbor UEs. In certain other implementations, the primary-secondary relationship may be chosen at random. The UE acting as the primary UE may switch periodically so each UE in a set of neighbor UEs is the primary UE for a certain period of time.

In certain configurations, UE A 502 may perform a beam sensing procedure to determine which TxOPs of the M TxOPs in a TxOP frame are available in the preferred beamforming direction for each of the neighbor UEs. For example, the reception component 532 may receive (at 529) interference and/or other signals related to neighbor transmissions in one or more TxOPs in a TxOP frame. The reception component 532 may send information associated with the interference and/or other signals to the interference mitigation component 528. The interference mitigation component 528 may determine the TxOPs which may carry network traffic based at least in part on detected (at 519) interference and/or collisions. Information associated with the TxOPs which carry network traffic may be sent to the resource booking component 546.

The resource booking component 546 may generate a first transmission schedule based at least in part on the information related to beam sensing procedure sent by the interference mitigation component 528. For example, the resource booking component 546 may generate a proposed first transmission schedule 540 that reserves a first set of TxOPs 541 (e.g., TxOP 1 and TxOP 2) for communications with UE B, a second set of TxOPs 543 (e.g., TxOP 6 and TxOP 7) for communications with UE C, and a third set of TxOPs 545 (e.g., TxOP 3, TxOP 4, TxOP 5, TxOP 8, TxOP 9, and TxOP 10) that are not reserved by UE A 502. In certain configurations, the proposed first transmission schedule 540 may include a reserved indicator (e.g., an 'R' flag) to indicate that the second set of TxOPs of the M TxOPs is reserved for communications between UE A 502 and an unspecified neighbor UE. The reserved indicator (e.g., used in TxOPs reserved for unspecified UE 538 in neighbor schedules 542) may be used instead of including a UE identification (ID) of the neighbor UE in order to protect the privacy of the neighbor UE. In certain implementations, the proposed first transmission schedule 540 may include a beam index and/or a quasi-collocation (QCL) index (or other QCL information) indicating the preferred beamforming direction associated with one or more of the first set of TxOPs and/or the second set of TxOPs. Including the beam index and/or QCL index may indicate to neighboring UEs which beam directions communications using the reserved TxOPs may occur. Based at least in part on the beam index and/or QCL index, the neighbor UEs may be able to determine to use the same TxOP for communications with other UEs in different beamforming directions, thereby increasing the spatial reuse of the network.

The resource booking component 546 may also generate a first scheduling request that includes the proposed first transmission schedule 540, and may send the first scheduling request to the transmission component 534. Using the transmission component 534, UE A 502 may transmit (at 511) the first scheduling request to one or more of UE B 504 and/or UE C 506. In certain configurations, the first scheduling request may include the proposed first transmission schedule 540 for M TxOPs, where M=10 in FIG. 5D. The first scheduling request may be transmitted (at 511) using, e.g., a D2D sidelink.

Figure 9:
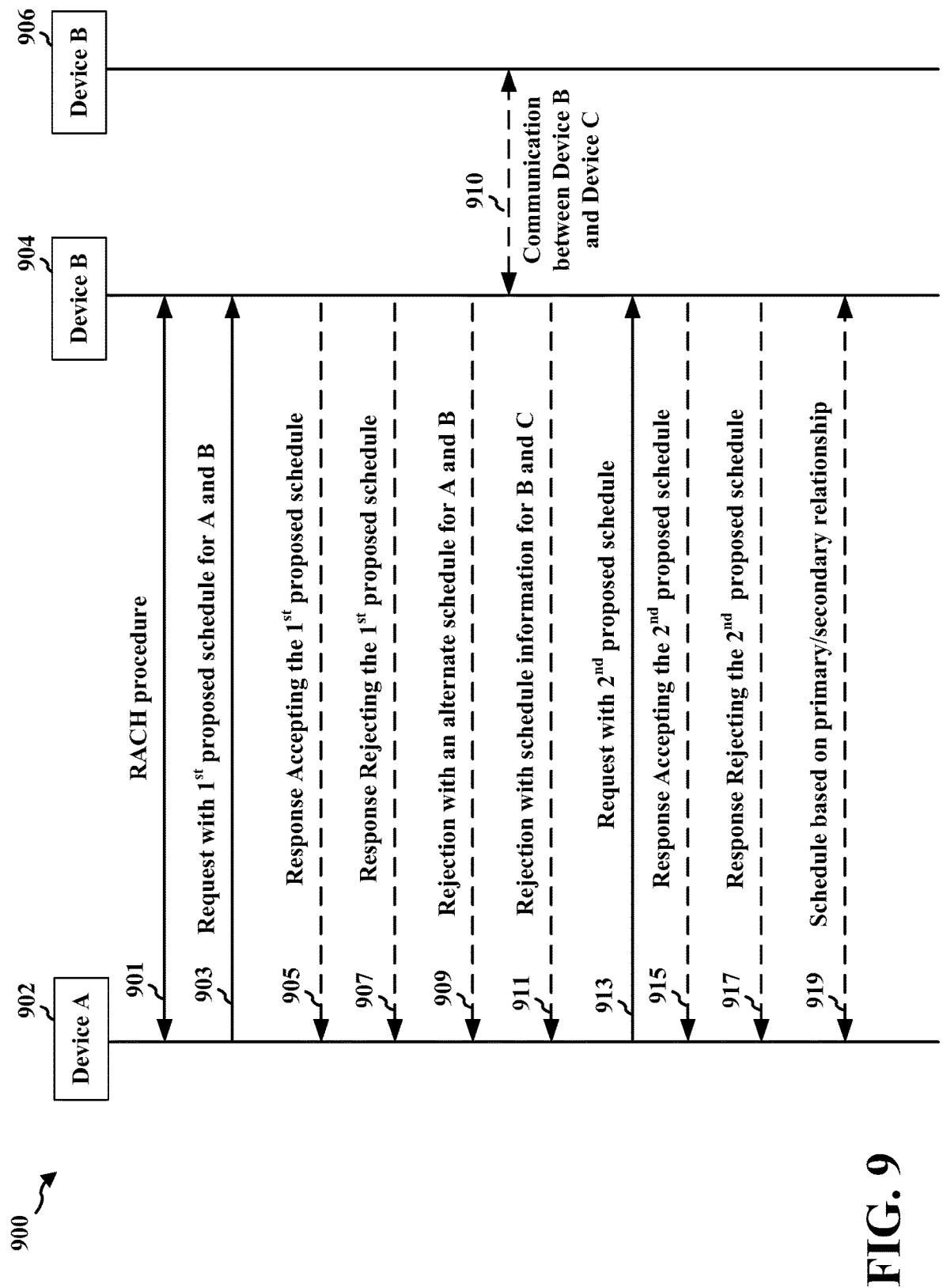
FIG. 9 is a diagram of an example communication flow between devices to negotiate resources for communication.

FIG. 9 illustrates an example communication flow 900 between a first device (Device A) 902 and a second device (Device B) 904 including request(s)/responses(s) to negotiate resources for communication between the two devices. The example flow 900 may be described with reference to FIG. 5D and may use the same reference numerals in FIG. 5D for ease of discussion. As described herein, the devices may first perform a RACH procedure, e.g., a 4 step RACH procedure 901. Following the RACH procedure, Device A 902 may transmit a scheduling request 903 to Device B 904 along with a proposed schedule (of TxOPs) for the communication between Device A (e.g., UE A 502) and Device B (e.g., UE B 504). The first scheduling request may include the proposed first transmission schedule 540 for M TxOPs, where M=10 in FIG. 5D.

Using the reception component 532, UE A 502 may receive (at 515) a first scheduling response from UE B 504. In certain configurations, the first scheduling response may indicate whether UE B 504 accepts or rejects the first scheduling request transmitted (at 511) by UE A 502. As illustrated at 905 in FIG. 9, Device B 904 may transmit a response accepting the proposed schedule from 903. For example, the first scheduling response may accept the first scheduling request by not including an alternative transmission schedule in the first scheduling response 905. As illustrated at 907, Device B 904 may respond with a rejection of the request. The rejection may be due to a conflict of the proposed schedule in 903 with another schedule used by Device B for communication with another device. Thus, additionally and/or alternatively, the scheduling response may include an alternative transmission schedule for communication between Device A (e.g., UE A 502) and Device B (e.g., UE A 504) based on the M TxOPs, e.g., as illustrated at 907.

The alternate transmission schedule sent at 909 may indicate a fourth set of TxOPs 544 of the M TxOPs that is reserved by UE B 504 for communication with UE A 502 as an alternative to the proposed schedule sent by Device A at 903. Thus, Device B may continue the negotiation even when the first scheduling response rejects the first scheduling request by including a proposed alternative transmission schedule. Additionally and/or alternatively, Device B may respond to Device A by sending neighbor scheduling information 911 about TxOPs that are reserved for communications 910 between the Device B and a different UE (e.g., Device C 906) from among a plurality of neighbor UEs. Device B might indicate the reserved resources without identifying Device C.

The reception component 532 may send the first scheduling response and/or a neighbor scheduling information 542, received at 911, to the resource booking component 546. Using the neighbor scheduling information 542, resource booking component 546 may generate a second proposed transmission schedule by adjusting and/or updating (at 517) the first proposed transmission schedule sent at 903. In certain aspects, the second proposed transmission schedule, sent at 913, may indicate a different set of TxOPs of the M TxOPs reserved for communication between UE A 502 and UE B 504. The different set of TxOPs (e.g., in the first proposed transmission schedule at 903 and in the second proposed transmission schedule at 913) may include at least one different TxOPs. The TxOPs may be completely different or only partially different.

The resource booking component 546 may generate a second scheduling request that includes the second proposed transmission schedule, and send the second scheduling request to the transmission component 534, e.g., as illustrated at 913 in FIG. 9. UE A 502 may transmit (at 511) the second scheduling request that includes the second proposed transmission schedule to at least UE B 504 of the plurality of neighbor UEs using the transmission component 534. In certain configurations, the second proposed transmission schedule may be transmitted via a unicast link and/or D2D link established with at least UE B 504. In certain other configurations, the second proposed transmission schedule may be transmitted using the preferred beamforming direction associated with UE B 504.

Using the reception component 532, UE A 502 may receive a second scheduling response from UE B 504, e.g., at 915/917 in FIG. 9. In certain aspects, the second scheduling response may either accept (e.g., 915) or reject (e.g., 917) the second scheduling request 913. The second scheduling response 917 may include another alternative transmission schedule and/or additional scheduling information, similar to example rejections 909, 911. The resource booking component 546 may update (at 517) the second proposed transmission schedule based at least in part on the alternative transmission schedule. The process may continue until Device A and Device B find a transmission schedule that is acceptable for both devices.

In scenarios in which a TxOP frame schedule cannot be agreed upon by Device A and Device B, one of the Devices may select the TxOP schedule based on a primary-secondary relationship between the UE, e.g., as described in connection with 604 in FIG. 6. Thus, at 919, Device B may send a message 919 with a schedule selected by Device B as the primary device that should be used by Device A as the secondary device. The primary and secondary device relationship may be agreed at an earlier point, such as during the RACH procedure 901. Similarly, if Device A were the primary device, then Device A would send the message 919 to Device B as the secondary device. The selected schedule, in message 919, may be sent after a certain number of scheduling requests or proposed schedules and responses rejecting proposed schedules.

Once the two devices agree upon a transmission schedule, UE A 502 may monitor or communicate (at 523) data based on the accepted transmission schedule, e.g., such as when the second scheduling response 915 does not include an alternate transmission schedule. Using a TxOP schedule negotiated using the techniques described above, UE A 502 may transmit and/or receive (at 525 and 527, respectively) one or more data transmissions from UE B 504 in a reserved TxOP. For example, when UE A 502 is a vehicle, the interface to V2X 536 may generate one or more V2X messages to send to UE B 506, and send a V2X message to the transmission component 534. The transmission component 534 may transmit (at 525) a V2X message to UE B 504 using one or more TxOPs reserved for communications between UE A 502 and UE B 504. Similarly, the reception component 532 may receive (at 527) a V2X message from UE B 504 using one or more TxOPs reserved for communications between UE A 502 and UE B 504, and send the V2X message to the interface for V2X 536 for processing. When UE A 502 and UE B 504 are both vehicles, the V2X messages may communicate information related to the UE's speed, acceleration, direction, route, and/or destination, etc. Using the information received in the V2X message(s), UE A 502 may change one or more of speed, acceleration, direction, route, and/or destination, etc. for safety.

Periodically, UE A 502 may determine if the network traffic has changed, e.g., either using the beam sensing procedure (e.g., sensing beam usage patterns by a set of neighbor UEs, sensing which beam directions have network traffic, etc.)) described above, or based on TxOP scheduling updates received from neighbor UEs. Upon determining the network traffic has changed, UE A 502 may generate a new transmission schedule that is included in a schedule update message (e.g., SCH_UPDATE message) that is sent to one or more of the neighboring UEs.

Using the slow-loop booking procedure described above in connection with FIG. 5D, the first half-duplex conflict 501, the second half-duplex conflict 503, and the deafness challenge 505 described above in connection with FIG. 5A may be resolved. However, the slow-loop booking procedure may not resolve the secondary conflict 507 and/or the exposed node challenge 509 described above in FIG. 5A.

Figure 6:
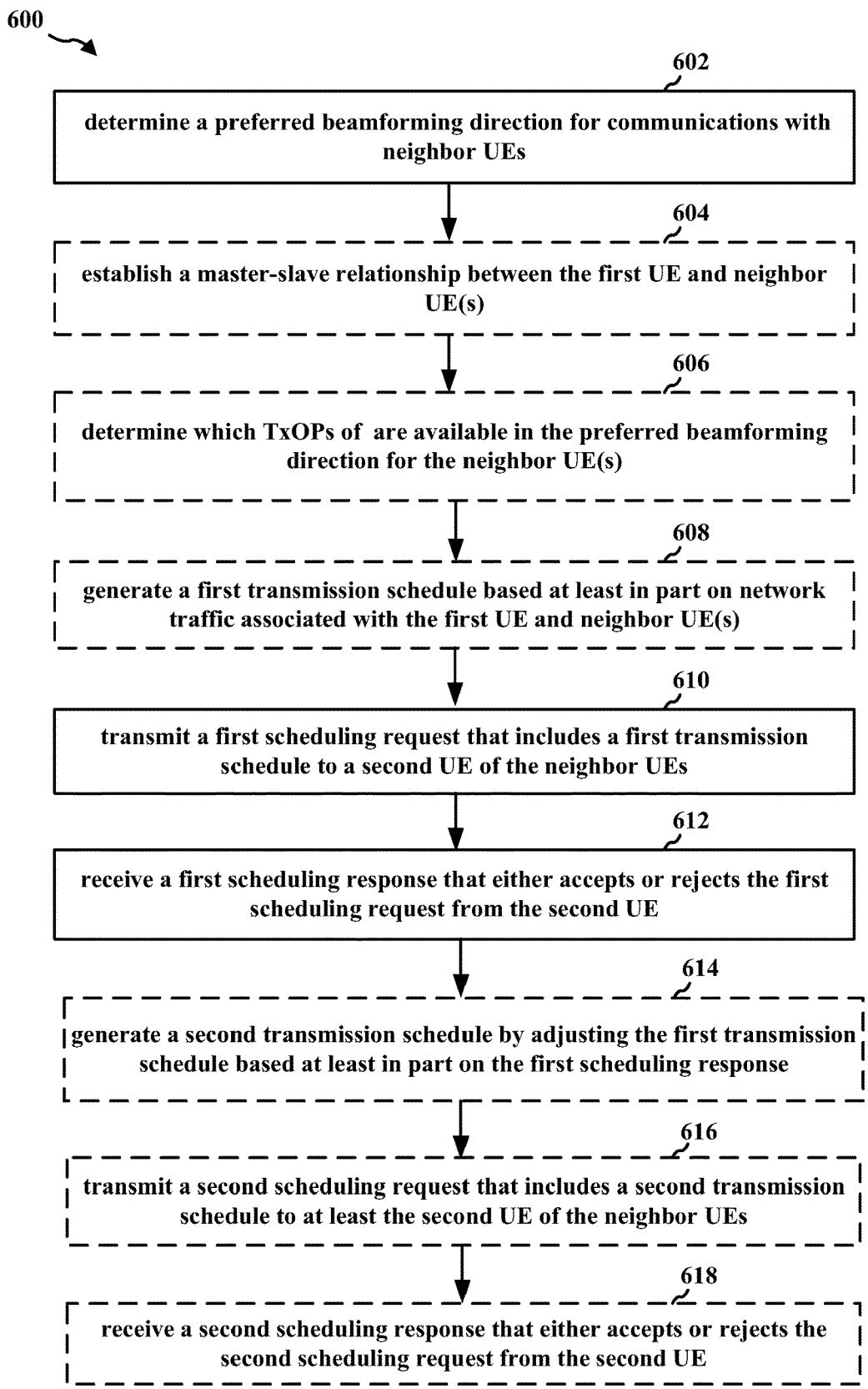
FIG. 6 is a flowchart of a method of wireless communication.

FIG. 6 is a flowchart 600 of a method of wireless communication. The method may be performed by a first UE (e.g., UE 104, 350, UE A 502, UE B 504, UE C 506, the apparatus 702/702'; the processing system 814, which may include memory 360 and which may comprise an entire UE or a component of a UE, such as a TX processor 368, the RX processor 356, and/or the controller/processor 359). In FIG. 6, optional operations are indicated with dashed lines. The method improves directional communication between devices by helping to avoid conflicts and improving latency through the negotiation of resources for communication directly between devices.

Referring to FIG. 6, at 602, the first UE may determine a preferred beamforming direction for communications with each of a plurality of neighbor UEs. For example, referring to FIG. 5D, UE A 502 may perform a beamforming procedure with each of UE B 504 and UE C 506 to determine a preferred beamforming direction for communications with each of UE B 504 and UE C 506. For example, UE A 502 may perform the beamforming procedure as described above in connection with FIG. 4. In certain implementations, the reception component 532 and/or the transmission component 534 may perform the beamforming procedure by exchanging (at 513 and 517) L2 messages related to beamforming, e.g., such as beam refining messages (e.g., beam_refining message) and/or instructions (e.g., beam_alive message) to maintain a previously determined beamforming direction.

At 604, the first UE may establish a primary-secondary relationship between the first UE and one or more of the plurality of neighbor UEs. In certain aspects, the primary-secondary relationship may be established during a RACH procedure. For example, referring to FIG. 5D, a primary-secondary relationship between the first UE and one or more of the plurality of neighbor UEs may be established during the beamforming procedure. The primary-secondary relationship may be useful in scenarios in which a TxOP frame schedule cannot be agreed upon by two or more UEs. For example, when UE A 502 is the primary UE, and an agreement cannot be reached with a secondary UE with respect to a TxOP frame schedule, UE A 502 may select the TxOP frame schedule that will be used by UE A 502 and the secondary UE. In certain implementations, the primary-secondary relationship may be negotiated and/or determined during the 4-way handshake RACH procedure performed to discover neighbor UEs. In certain other implementations, the primary-secondary relationship may be chosen at random, and may switch periodically so each UE in a set of neighbor UEs is the primary UE for a certain period of time.

At 606, the first UE may determine which TxOPs of the plurality of TxOPs, e.g., M TxOPs, are available in the preferred beamforming direction for each of the plurality of neighbor UEs. A first transmission schedule may be generated based on which TxOPs of the plurality of TxOPs are available. For example, referring to FIG. 5D, UE A 502 may perform a beam sensing procedure to determine which TxOPs of the M TxOPs in a TxOP frame are available in the preferred beamforming direction for each of the neighbor UEs. For example, the reception component 532 may receive (at 529) interference and/or other signals related to neighbor transmissions in one or more TxOPs in a TxOP frame. The reception component 532 may send information associated with the interference and/or other signals to the interference mitigation component 528. The interference mitigation component 528 may determine the TxOPs which may carry network traffic based at least in part on detected (at 519) interference and/or collisions. Information associated with the TxOPs which carry network traffic may be sent to the resource booking component 546.

At 608, the first UE may generate the first transmission schedule based at least in part on network traffic associated with the first UE and one or more of the plurality of neighbor UEs. In certain aspects, the first scheduling request may include a first transmission schedule for plurality of TxOPs, e.g., a proposed transmission schedule, similar to 903. In certain other aspects, the first transmission schedule may indicate a first set of TxOPs of the plurality of TxOPs reserved by the first UE for communication with the second UE. In certain other aspects, the first transmission schedule may indicate a second set of TxOPs of the plurality of TxOPs reserved for communications between the first UE and a third UE from among the plurality of neighbor UEs. In certain other aspects, the first transmission schedule may further indicate a third set of TxOPs of the plurality of TxOPs available for communication with the first UE. In certain other aspects, the first transmission schedule may include a reserved indicator to indicate that the second set of TxOPs of the plurality of TxOPs is reserved for communications by the first UE.

In certain other aspects, the first transmission schedule may include a beam index associated with the preferred beamforming direction associated with the second set of TxOPs for communications by the first UE. In certain other aspects, the first transmission schedule may indicate a QCL associated with the preferred beamforming direction associated with the second set of TxOPs for communications by the first UE. In certain aspects, the first transmission schedule may be generated based at least in part on an outcome of the beam sensing procedure. For example, referring to FIG. 5D, the resource booking component 546 may generate a first transmission schedule based at least in part on the information related to beam sensing procedure sent by the interference mitigation component 528. For example, the resource booking component 546 may generate a proposed first transmission schedule 540 that reserves a first set of TxOPs 541 (e.g., TxOP 1 and TxOP 2) for communications with UE B, a second set of TxOPs 543 (e.g., TxOP 6 and TxOP 7) for communications with UE C, and a third set of TxOPs 545 (e.g., TxOP 3, TxOP 4, TxOP 5, TxOP 8, TxOP 9, and TxOP 10) that are not reserved by UE A 502.

In certain configurations, the proposed first transmission schedule 540 may include a reserved indicator (e.g., an 'R' flag) to indicate that the second set of TxOPs of the plurality of TxOPs is reserved for communications between UE A 502 and an unspecified neighbor UE. The reserved indicator (e.g., used in TxOPs reserved for unspecified UE 538 in neighbor schedules 542) may be used instead of including a UE identification (ID) of the neighbor UE in order to protect the privacy of the neighbor UE. In certain implementations, the proposed first transmission schedule 540 may indicate a beam index and/or quasi-collocation (QCL) index indicating the preferred beamforming direction associated with one or more of the first set of TxOPs and/or the second set of TxOPs. Including the beam index and/or QCL index may indicate to neighboring UEs which beam directions communications using the reserved TxOPs may occur. Based at least in part on the beam index and/or QCL index, the neighbor UEs may be able to determine to use the same TxOP for communications with other UEs in different beamforming directions, thereby increasing the spatial reuse of the network.

At 610, the first UE may transmit a first scheduling request to a second UE from among the plurality of neighbor UEs. In certain aspects, the first scheduling request may be transmitted to the second UE via a D2D sidelink. For example, referring to FIG. 5D, UE A 502 may transmit (at 511) the first scheduling request to one or more of UE B 504 and/or UE C 506. In certain configurations, the first scheduling request may include a first transmission schedule, e.g., the proposed first transmission schedule 540 for plurality of TxOPs, e.g., M TxOPs where M=10 in FIG. 5D. The first scheduling request may be transmitted (at 511) using, e.g., a D2D sidelink At 612, the first UE may receive a first scheduling response from the second UE. In certain aspects, the first scheduling response may indicate whether the second UE accepts or rejects the first scheduling request. In certain other aspects, the first scheduling response includes an alternate transmission schedule for the plurality of TxOPs when the first scheduling response rejects the first scheduling request. In certain other aspects, the second transmission schedule may indicate an alternate set of TxOPs of the plurality of TxOPs that is reserved by the second UE for communication with the first UE when the first scheduling response rejects the first scheduling request. In certain other aspects, the second transmission schedule may indicate a second set of TxOPs of the plurality of TxOPs reserved for communications between the second UE and a third UE from among the plurality of neighbor UEs. For example, referring to FIG. 5D, using the reception component 532, UE A 502 may receive (at 515) a first scheduling response from UE B 504. In certain configurations, the first scheduling response may indicate whether UE B 504 accepts or rejects the first scheduling request transmitted (at 511) by UE A 502. For example, the first scheduling response may accept the first scheduling request when the first scheduling response does not include an alternative transmission schedule. Additionally and/or alternatively, the first scheduling request may include an alternative transmission schedule for the plurality of TxOPs when the first scheduling response rejects the first scheduling request. The second transmission schedule may indicate an alternate set of TxOPs 544 of the plurality of TxOPs that is reserved by UE B 504 for communication with UE A 502 when the first scheduling response rejects the first scheduling request. Additionally and/or alternatively, the second transmission schedule may indicate a set of TxOPs 538 of the plurality of TxOPs reserved for communications between the UE B 506 and a third UE (e.g., Device C) from among the plurality of neighbor UEs.

At 614, the first UE may generate a second transmission schedule by adjusting the first transmission schedule. In certain aspects, the second transmission schedule may avoid a set of TxOPs of the plurality of TxOPs reserved for communication between the second UE and the third UE. In certain other aspects, the TxOPs may be different than the first set of TxOPs indicated in the first transmission schedule. For example, referring to FIG. 5D, using the set of TxOPs 542 reserved by the second UE for communication with a different UE, resource booking component 546 may generate a second proposed transmission schedule by adjusting and/or updating (at 517) the first transmission schedule. In certain aspects, the second transmission schedule (not shown in FIG. 5D) may indicate at least one different TxOP of the plurality of TxOPs reserved for communication between UE A 502 and UE B 504 than the first transmission schedule. The different set of TxOPs may be different than the first set of TxOPs 541 indicated in the first transmission schedule.

At 616, the first UE may transmit a second scheduling request that includes the second transmission schedule to at least the second UE of the plurality of neighbor UEs, e.g., upon generation of the second transmission schedule. In certain aspects, the second transmission schedule may be transmitted via a unicast link established with at least the second UE of the plurality of neighbor UEs. In certain other aspects, the second transmission schedule may be transmitted using the preferred beamforming direction associated with at least the second UE of the plurality of neighbor UEs. For example, referring to FIG. 5D, the resource booking component 546 may generate a second scheduling request that includes the second transmission schedule, and send the second scheduling request to the transmission component 534. UE A 502 may transmit (at 511) the second scheduling request that includes the second transmission schedule to at least UE B 504 of the plurality of neighbor UEs using the transmission component 534. In certain configurations, the second transmission schedule may be transmitted via a unicast link and/or D2D link established with at least UE B 504. In certain other configurations, the second transmission schedule may be transmitted using the preferred beamforming direction associated with UE B 504.

At 618, the first UE may receive a second scheduling response from the second UE. In certain aspects, the second scheduling response may either accept or reject the second scheduling request. For example, referring to FIG. 5D, using the reception component 532, UE A 502 may receive a second scheduling response from UE B 504. In certain aspects, the second scheduling response may either accept or reject the second scheduling request. When the second scheduling response includes an alternative transmission schedule, the resource booking component 546 may update (at 517) the third transmission schedule based at least in part on the alternative transmission schedule. Upon agreement of a schedule, communicating or monitoring for communications may take place according to the schedule. For example, a UE may tune transmission beam and/or a receive beam to a beamforming direction based on the schedule.

Figure 7:
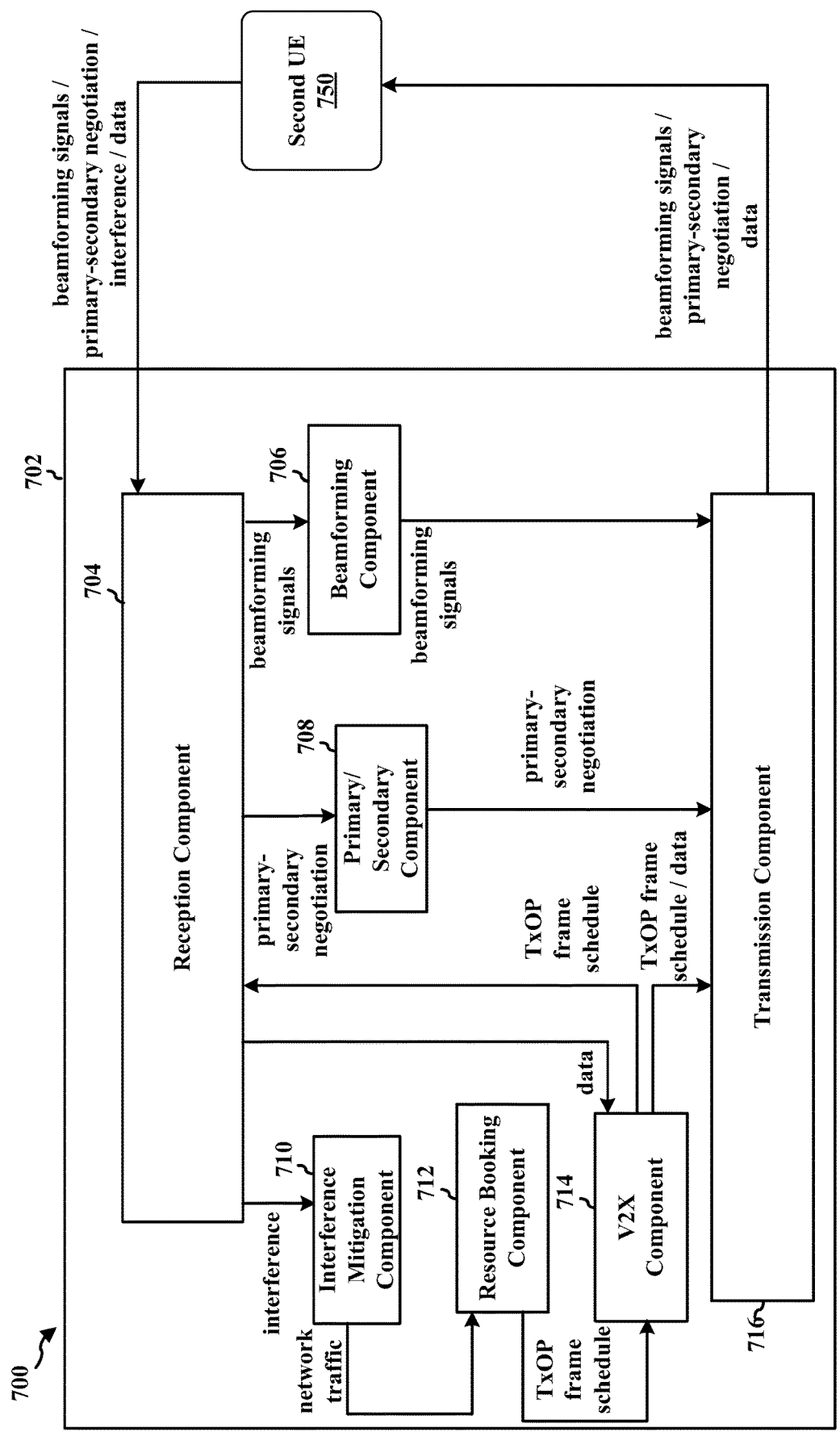
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus 702 may be a first UE (e.g., UE 104, 350, UE A 502, UE B 504, UE C 506, the apparatus 702') in communication with a second UE (e.g., UE 104, 350, UE A 502, UE B 504, UE C 506). The apparatus 702 may include a reception component 704, a beamforming component 706, a primary/secondary component 708, an interference mitigation component 710, a resource booking component 712, a V2X component 714, and a transmission component 716.

The beamforming component 706 may be configured to determine a preferred beamforming direction for communications with each of a plurality of neighbor UEs (e.g., including second UE 750). For example, the UE may perform a beamforming procedure with each of a plurality of neighbor UEs to determine the preferred beamforming direction. The beamforming component 706 may receive beamforming signals from a second UE 750 via the reception component 704, and may send beamforming signals to the second UE 750 via the transmission component 716.

The primary/secondary component 708 may be configured to establish a primary-secondary relationship between the first UE and one or more of the plurality of neighbor UEs. In certain aspects, the primary-secondary relationship may be established during a RACH procedure. The primary/secondary component 708 may receive primary/secondary signals from the second UE 750 via the reception component 704, and may send primary/secondary signals to the second UE 750 via the transmission component 716.

The interference mitigation component 710 may be configured to determine which TxOPs of the plurality of TxOPs are available in the preferred beamforming direction for each of the plurality of neighbor UEs. Interference and/or collision signals may be received from the second UE 750 or neighbor UEs (not shown) via the reception component 704. The interference mitigation component 710 may send a signal indicating which TxOPs are used by other neighboring UEs to the resource booking component 712.

The resource booking component 712 may be configured to generate the first transmission schedule, e.g., proposed transmission schedule, based at least in part on network traffic associated with the first UE and one or more of the plurality of neighbor UEs, e.g., as described in connection with 608. The resource booking component 712 may send a signal indicating the first transmission schedule to the transmission component 716 in a first scheduling request.

The transmission component 716 may be configured to transmit the first scheduling request to the second UE 750 from among the plurality of neighbor UEs, e.g., as described in connection with 610 in FIG. 6. In certain aspects, the first scheduling request may be transmitted to the second UE 750 via a D2D sidelink.

The reception component 704 may be configured to receive a first scheduling response from the second UE 750, e.g., as described in connection with 612. In certain aspects, the first scheduling response may indicate whether the second UE accepts or rejects the first scheduling request. In certain other aspects, the first scheduling response includes an alternate transmission schedule for the plurality of TxOPs or other scheduling information. The reception component 704 may be configured to send the first scheduling response to the resource booking component 712.

The resource booking component 712 may be configured to generate a second proposed transmission schedule by adjusting the first transmission schedule. In certain aspects, the third transmission schedule may avoid a second set of TxOPs of the plurality of TxOPs reserved for communication between the second UE and a third UE, e.g., as described in connection with 614. The resource booking component 712 may be configured to send the third transmission schedule to the transmission component 716 in a second scheduling request.

The transmission component 716 may be configured to transmit a second scheduling request that includes the third transmission schedule to the second UE 750 of the plurality of neighbor UEs upon generation of the third transmission schedule, e.g., as described in connection with 616. In certain aspects, the third transmission schedule may be transmitted via a unicast link established with the second UE 750 of the plurality of neighbor UEs. In certain other aspects, the third transmission schedule may be transmitted using the preferred beamforming direction associated with the second UE 750 of the plurality of neighbor UEs.

The reception component 704 may be configured to receive a second scheduling response from the second UE, e.g., as described in connection with 618. In certain aspects, the second scheduling response may either accept or reject the second scheduling request. The reception component 704 may be configured to send the second scheduling response to the resource booking component 712.

The resource booking component 712 may be configured to send information associated with the finalized transmission schedule to one or more of the reception component 704, the transmission component 716, and/or the V2X component 714.

The V2X component 714 may be configured to generate data for transmission using the finalized transmission schedule, and send the generated data to the transmission component 716. The transmission component 716 may be configured to send the data to the second UE 750 using the finalized transmission schedule. The reception component 704 may be configured to send any data received from the second UE 750 using the finalized transmission schedule to the V2X component 714 for processing.

As described in connection with FIG. 10, the apparatus 702 may correspond to a UE receiving a request for a transmission schedule, e.g., from second UE 750. In such an example, the reception component 704 may be configured to receive a first scheduling request from a second UE 750 (e.g., as described in connection with 1004).

The transmission component 716 may be configured to transmit a first scheduling response to the second UE 750 (e.g., as described in connection with 1006 The first scheduling response may indicate whether the first UE accepts or rejects the first scheduling request. For example, resource booking component 712 may be configured to determine whether to accept or reject the request. When the response rejects the first transmission schedule, the reception component 704 may receive a second scheduling request that includes a second, proposed transmission schedule to at least the second UE (e.g., as described in connection with 1010). The transmission component 716 may be configured to transmit a second scheduling response to the second UE in response to the second scheduling request (e.g., as described in connection with 1012).

The resource booking component 712 and/or the V2X component 714 may be configured to transmit a suggested transmission schedule to the second UE based at least in part on network traffic associated with the first UE and one or more of the plurality of neighbor UEs (e.g., as described in connection with 1008).

The UEs may establish a primary-secondary relationship between the first UE and the second UE. For example, the primary/secondary component 708 may be configured to establish a primary-secondary relationship with second UE 750 and/or other neighbor UEs (e.g., as described in connection with 1002).

The apparatus may include additional components that perform each of the blocks of the algorithm in the aforementioned flowcharts of any of FIGS. 6, 9, and/or 10. As such, each block in the aforementioned flowcharts of any of FIGS. 6, 9, and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
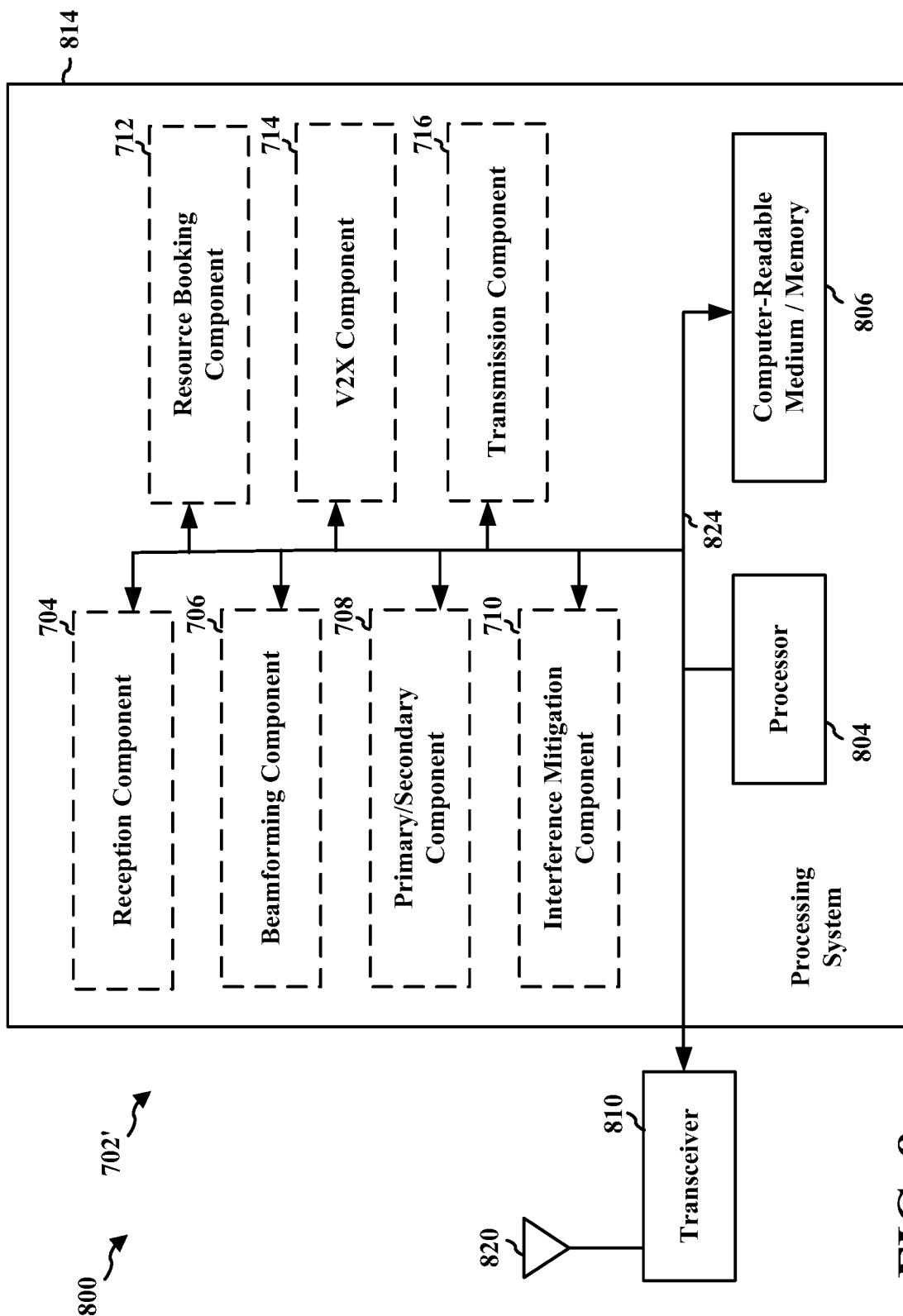
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 716, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the device 350 and may include the memory 360 and/or at least one of the TX processor 368, the RX processor 356, and the controller/processor 359. In an example, the processing system may comprise the entire device 350, e.g., such as an entire UE.

In certain configurations, the apparatus 702/702' for wireless communication may include means for determining a preferred beamforming direction for communications with each of a plurality of neighbor UEs. In certain other configurations, the apparatus 702/702' for wireless communication may include means for establishing a primary-secondary relationship between the first UE and one or more of the plurality of neighbor UEs. In certain aspects, the primary-secondary relationship may be established during a RACH procedure. In certain other configurations, the apparatus 702/702' for wireless communication may include means for determining which TxOPs of the plurality of TxOPs are available in the preferred beamforming direction for each of the plurality of neighbor UEs. In certain other configurations, the apparatus 702/702' for wireless communication may include means for generate the first transmission schedule based at least in part on network traffic associated with the first UE and one or more of the plurality of neighbor UEs. In certain aspects, the first scheduling request may include a first transmission schedule for plurality of TxOPs. In certain other aspects, the first transmission schedule may indicate a first set of TxOPs of the plurality of TxOPs reserved by the first UE for communication with the second UE. In certain other aspects, the first transmission schedule may indicate a second set of TxOPs of the plurality of TxOPs reserved for communications between the first UE and a third UE from among the plurality of neighbor UEs. In certain other aspects, the first transmission schedule may further indicate a third set of TxOPs of the plurality of TxOPs available for communication with the first UE. In certain other aspects, the first transmission schedule may include a reserved indicator to indicate that the second set of TxOPs of the plurality of TxOPs is reserved for communications by the first UE. In certain other aspects, the first transmission schedule may include a beam index associated with the preferred beamforming direction associated with the second set of TxOPs for communications by the first UE. In certain other aspects, the first transmission schedule may indicate a QCL associated with the preferred beamforming direction associated with the second set of TxOPs for communications by the first UE. In certain aspects, the first transmission schedule may be generated based at least in part on an outcome of the beam sensing procedure. In certain other configurations, the apparatus 702/702' for wireless communication may include means for transmitting a first scheduling request to a second UE from among the plurality of neighbor UEs. In certain aspects, the first scheduling request may be transmitted to the second UE via a D2D sidelink. In certain other configurations, the apparatus 702/702' for wireless communication may include means for receive a first scheduling response from the second UE. In certain aspects, the first scheduling response may indicate whether the second UE accepts or rejects the first scheduling request. In certain other aspects, the first scheduling response includes an alternate transmission schedule for the plurality of TxOPs when the first scheduling response rejects the first scheduling request. In certain other aspects, the second transmission schedule may indicate an alternate set of TxOPs of the plurality of TxOPs that is reserved by the second UE for communication with the first UE when the first scheduling response rejects the first scheduling request. In certain other aspects, the second transmission schedule may indicate a second set of TxOPs of the plurality of TxOPs reserved for communications between the second UE and a third UE from among the plurality of neighbor UEs. In certain other configurations, the apparatus 702/702' for wireless communication may include means for generating a second transmission schedule by adjusting the first transmission schedule to avoid a set of TxOPs of the plurality of TxOPs reserved for communication between the second UE and the third UE. In certain other configurations, the apparatus 702/702' for wireless communication may include means for transmitting a second scheduling request that includes the second transmission schedule to at least the second UE of the plurality of neighbor UEs. In certain aspects, the second transmission schedule may be transmitted via a unicast link established with at least the second UE of the plurality of neighbor UEs. In certain other aspects, the second transmission schedule may be transmitted using the preferred beamforming direction associated with at least the second UE of the plurality of neighbor UEs. In certain other configurations, the apparatus 702/702' for wireless communication may include means for receive a second scheduling response from the second UE. In certain aspects, the second scheduling response may either accept or reject the second scheduling request. In an example in which the apparatus is a device receiving a request for a transmission schedule, the apparatus may include means for receiving a scheduling request from a second UE, means for transmitting a scheduling response to the second UE indicating whether the first UE accepts or rejects the first scheduling request, means for transmitting a suggested transmission schedule to the second UE based at least in part on network traffic associated with the first UE and one or more of the plurality of neighbor UEs, and/or means for establishing a primary-secondary relationship with second UE. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
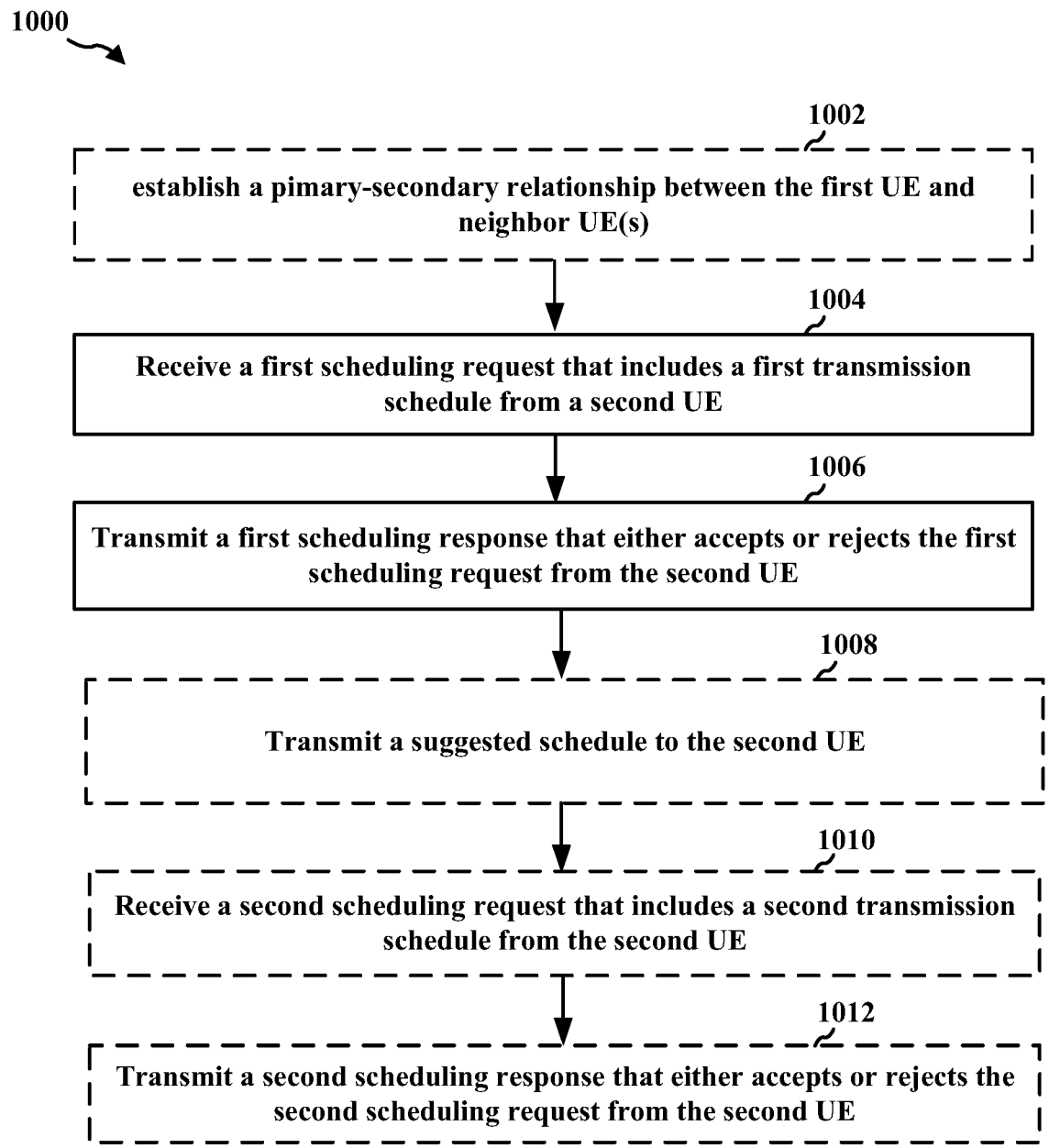
FIG. 10 is a flowchart of a method of wireless communication.

FIG. 10 is a flowchart 1000 of a method of wireless communication. The method may be performed by a first UE (e.g., UE 104, 350, UE A 502, UE B 504, UE C 506, the apparatus 702/702'; the processing system 814, which may include memory 360 and which may comprise an entire UE or a component of a UE, such as a TX processor 368, the RX processor 356, and/or the controller/processor 359). In FIG. 10, optional operations are indicated with dashed lines. The method improves directional communication between devices by helping to avoid conflicts and improving latency through the negotiation of resources for communication directly between devices.

As illustrated at 1004, the first UE may receive a first scheduling request from a second UE (e.g., that may be one of a plurality of neighbor UEs). The first scheduling request may include a first transmission schedule for a plurality of TxOPs and indicating a first set of TxOPs of the plurality of TxOPs reserved by the second UE for communication with the first UE, e.g., as described in connection with FIGS. 6 and 9. For example, the first UE that receives the scheduling request may correspond to Device B 904 in the example of FIG. 9. The second UE from which the scheduling request is received may correspond to Device A 902 in FIG. 9, for example. The first scheduling request may be received from the second UE via a D2D sidelink.

The first transmission schedule may indicate a reserved set of TxOPs of the plurality of TxOPs reserved for communications between the second UE and a third UE from among the plurality of neighbor UEs. The first transmission schedule may further indicate an available set of TxOPs of the plurality of TxOPs available for communication with the second UE. The first transmission schedule may include a reserved indicator to indicate that the reserved set of TxOPs of the plurality of TxOPs is reserved for communications by the second UE. The first transmission schedule may include a beam index associated with the preferred beamforming direction associated with the second set of TxOPs for communications by the second UE. The first transmission schedule may indicate QCL information associated with the preferred beamforming direction associated with the reserved set of TxOPs for communications by the second UE.

As illustrated at 1006, the first UE (e.g., Device B 904 in FIG. 9) may transmit a first scheduling response to the second UE (e.g., Device A 902 in FIG. 9). The first scheduling response may indicate whether the first UE accepts or rejects the first scheduling request, e.g., as described in connection with 905 or 907 in FIG. 9.

As illustrated at 1008, the first UE may transmit a suggested transmission schedule to the second UE based at least in part on network traffic associated with the first UE and one or more of the plurality of neighbor UEs. For example, when the first scheduling response rejects the first scheduling request, the first UE may transmit an alternate transmission schedule for the plurality of TxOPs, e.g., a suggested schedule, at 1008. The suggested alternate transmission schedule may be included in the response at 1006, or may be transmitted in a separate message to the second UE. The alternate transmission schedule suggested by the first UE, at 1008, may indicate an alternate set of TxOPs of the plurality of TxOPs that is reserved by the first UE for communication with the second UE. In another example, the first UE may provide scheduling information about a set of TxOPs of the plurality of TxOPs that are reserved for communications between the first UE and a third UE from among the plurality of neighbor UEs.

When the response, at 1006, rejects the first transmission schedule, the first UE may receive a second scheduling request, at 1010, that includes a second, proposed transmission schedule to at least the second UE of the plurality of neighbor UEs. The second transmission schedule may be received, at 610, from a preferred beamforming direction associated with the first UE second UE.

The UE may transmit a second scheduling response to second UE, at 612. The second scheduling response may either accept or reject the second scheduling request received at 610, e.g., as described in connection with 915 or 917 in FIG. 9.

The UEs may establish a primary-secondary relationship between the first UE and the second UE, e.g., at 1002. The primary-secondary relationship may be established between the first UE and a plurality of neighbor UEs. The primary-secondary relationship may established during a random access procedure. Thus, the first UE and second UE may determine an agreed upon transmission schedule based on the primary-secondary relationship, e.g., as described in connection with 602 in FIGS. 6 and 919 in FIG. 9.

The following examples are illustrative only and may be combined with aspects of other embodiments, aspects, or teaching described herein, without limitation.

Example 1 is a method of wireless communication at a first UE, comprising: determining a preferred beamforming direction for communications with each of a plurality of neighbor UEs; transmitting a first scheduling request to a second UE from among the plurality of neighbor UEs, the first scheduling request including a first transmission schedule for a plurality of transmission opportunities (TxOPs), the first transmission schedule indicating a first set of TxOPs of the plurality of TxOPs reserved by the first UE for communication with the second UE; and receiving a first scheduling response from the second UE, the first scheduling response indicating whether the second UE accepts or rejects the first scheduling request.

In Example 2, the method of Example 1 further includes generating the first transmission schedule based at least in part on network traffic associated with the first UE and one or more of the plurality of neighbor UEs.

In Example 3, the method of Example 1 or 2 further includes determining which TxOPs of the plurality of TxOPs are available in the preferred beamforming direction for each of the plurality of neighbor UEs, the first transmission schedule being further generated based at least in part on which TxOPs of the plurality of TxOPs are available.

In Example 4, the method of any of Example 1-3 further includes that the first transmission schedule indicates a second set of TxOPs of the plurality of TxOPs reserved for communications between the first UE and a third UE from among the plurality of neighbor UEs, and the first transmission schedule further indicates a third set of TxOPs of the plurality of TxOPs available for communication with the first UE.

In Example 5, the method of any of Example 1-4 further includes that the first transmission schedule includes a reserved indicator to indicate that the second set of TxOPs of the plurality of TxOPs is reserved for communications by the first UE.

In Example 6, the method of any of Example 1-5 further include that the first transmission schedule includes a beam index associated with the preferred beamforming direction associated with the second set of TxOPs for communications by the first UE.

In Example 7, the method of any of Example 1-6 further includes that the first transmission schedule indicates a QCL associated with the preferred beamforming direction associated with the second set of TxOPs for communications by the first UE.

In Example 8, the method of any of Example 1-7 further includes that the first scheduling response rejects the first scheduling request and includes an alternate transmission schedule for the plurality of TxOPs, and the alternate transmission schedule indicates an alternate set of TxOPs of the plurality of TxOPs that is reserved by the second UE for communication with the first UE.

In Example 9, the method of any of Example 1-8 further includes that the first scheduling response rejects the first scheduling request and includes scheduling information about a set of TxOPs of the plurality of TxOPs that are reserved for communications between the second UE and a third UE from among the plurality of neighbor UEs.

In Example 10, the method of any of Example 1-9 further includes generating a second transmission schedule by adjusting the first transmission schedule, the second transmission schedule avoiding the set of TxOPs reserved for communication between the second UE and the third UE.

In Example 11, the method of any of Example 1-10 further includes transmitting a second scheduling request that includes the second transmission schedule to at least the second UE of the plurality of neighbor UEs.

In Example 12, the method of any of Example 1-11 further includes that the third transmission schedule is transmitted via a unicast link established with at least the second UE of the plurality of neighbor UEs.

In Example 13, the method of any of Example 1-12 further includes that the second transmission schedule is transmitted using the preferred beamforming direction associated with at least the second UE of the plurality of neighbor UEs.

In Example 14, the method of any of Example 1-13 further includes receiving a second scheduling response from the second UE, the second scheduling response either accepting or rejecting the second scheduling request.

In Example 15, the method of any of Example 1-14 further includes establishing a primary-secondary relationship between the first UE and one or more of the plurality of neighbor UEs.

In Example 16, the method of any of Examiner 1-15 further includes that the primary-secondary relationship is established during a random access channel (RACH) procedure.

In Example 17, the method of any of Example 1-16 further includes that the first scheduling request is transmitted to the second UE via a device-to-device (D2D) sidelink.

Example 18 is a device including one or more processors and one or more memories in electronic communication with the one or more processors storing instructions executable by the one or more processors to cause the system or apparatus to implement a method as in any of Examples 1-17.

Example 19 is a system or apparatus including means for implementing a method or realizing an apparatus as in any of Examples 1-17.

Example 20 is a non-transitory computer readable medium storing instructions executable by one or more processors to cause the one or more processors to implement a method as in any of Examples 1-17.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
    determining a preferred beamforming direction for communications with each of a plurality of neighbor UEs;
    generating a first transmission schedule based at least in part on network traffic associated with the first UE and one or more of the plurality of neighbor UEs;
    transmitting a first scheduling request to a second UE from among the plurality of neighbor UEs, the first scheduling request including the first transmission schedule for a plurality of transmission opportunities (TxOPs), the first transmission schedule indicating a first set of TxOPs of the plurality of TxOPs reserved by the first UE for communication with the second UE; and
    receiving a first scheduling response from the second UE, the first scheduling response indicating whether the second UE accepts or rejects the first scheduling request.

2. The method of claim 1, further comprising: determining which TxOPs of the plurality of TxOPs are available in the preferred beamforming direction for each of the plurality of neighbor EEs, the first transmission schedule being further generated based at least in part on which TxOPs of the plurality of TxOPs are available.

3. The method of claim 1, wherein:
    the first transmission schedule indicates a second set of TxOPs of the plurality of TxOPs reserved for communications between the first UE and a third UE from among the plurality of neighbor UEs, and the first transmission schedule further indicates a third set of TxOPs of the plurality of TxOPs available for communication with the first UE.

4. The method of claim 3, wherein the first transmission schedule includes a reserved indicator to indicate that the second set of TxOPs of the plurality of TxOPs is reserved for communications by the first UE.

5. The method of claim 3, wherein the first transmission schedule includes a beam index associated with the preferred beamforming direction associated with the second set of TxOPs for communications by the first UE.

6. The method of claim 3, wherein the first transmission schedule indicates a quasi-colocation (QCL) associated with the preferred beamforming direction associated with the second set of TxOPs for communications by the first UE.

7. The method of claim 1, wherein:
the first scheduling response rejects the first scheduling request and includes an alternate transmission schedule for the plurality of TxOPs, and
the alternate transmission schedule indicates an alternate set of TxOPs of the plurality of TxOPs that is reserved by the second UE for communication with the first UE.

8. The method of claim 1, wherein the first scheduling response rejects the first scheduling request and includes scheduling information about a set of TxOPs of the plurality of TxOPs that are reserved for communications between the second UE and a third UE from among the plurality of neighbor UEs.

9. The method of claim 8, further comprising:
generating a second transmission schedule by adjusting the first transmission schedule, the second transmission schedule avoiding the set of TxOPs reserved for communication between the second UE and the third UE.

10. The method of claim 9, further comprising:
transmitting a second scheduling request that includes the second transmission schedule to at least the second UE of the plurality of neighbor UEs.

11. The method of claim 10, wherein a third transmission schedule is transmitted via a unicast link established with at least the second UE of the plurality of neighbor UEs.

12. The method of claim 10, wherein the second transmission schedule is transmitted using the preferred beamforming direction associated with at least the second UE of the plurality of neighbor UEs.

13. The method of claim 10, further comprising:
receiving a second scheduling response from the second UE, the second scheduling response either accepting or rejecting the second scheduling request.

14. The method of claim 1, further comprising:
establishing a primary-secondary relationship between the first UE and one or more of the plurality of neighbor UEs.

15. The method of claim 14, wherein the primary-secondary relationship is established during a random access channel (RACH) procedure.

16. The method of claim 1, wherein the first scheduling request is transmitted to the second UE via a device-to-device (D2D) sidelink.

17. An apparatus for wireless communication of a first user equipment (UE), comprising:
means for determining a preferred beamforming direction for communications with each of a plurality of neighbor UEs;
means for generating a first transmission schedule based at least in part on network traffic associated with the first UE and one or more of the plurality of neighbor UEs;
means for transmitting a first scheduling request to a second UE from among the plurality of neighbor UEs, the first scheduling request including the first transmission schedule for a plurality of transmission opportunities (TxOPs), the first transmission schedule indicating a first set of TxOPs of the plurality of TxOPs reserved by the first UE for communication with the second UE; and
means for receiving a first scheduling response from the second UE, the first scheduling response indicating whether the second UE accepts or rejects the first scheduling request.

18. The apparatus of claim 17, further comprising: means for determining which TxOPs of the plurality of TxOPs are available in the preferred beamforming direction for each of the plurality of neighbor UEs, the first transmission schedule being further generated based at least in part on which TxOPs of the plurality of TxOPs are available.

19. The apparatus of claim 17, wherein:
the first transmission schedule indicates a second set of TxOPs of the plurality of TxOPs reserved for communications between the first UE and a third UE from among the plurality of neighbor UEs, and
the first transmission schedule further indicates a third set of TxOPs of the plurality of TxOPs available for communication with the first UE.

20. The apparatus of claim 17, wherein:
the first scheduling response rejects the first scheduling request and includes an alternate transmission schedule for the plurality of TxOPs, and
the alternate transmission schedule indicates an alternate set of TxOPs of the plurality of TxOPs that is reserved by the second UE for communication with the first UE.

21. The apparatus of claim 17, wherein the first scheduling response rejects the first scheduling request and includes scheduling information about a set of TxOPs of the plurality of TxOPs reserved for communications between the second UE and a third UE from among the plurality of neighbor UEs, the apparatus further comprising:
means for generating a second transmission schedule by adjusting the first transmission schedule to avoid the set of TxOPs of the plurality of TxOPs reserved for communication between the second UE and the third UE.

22. The apparatus of claim 21, further comprising:
means for transmitting a second scheduling request that includes the second transmission schedule to at least the second UE of the plurality of neighbor UEs; and
means for receiving a second scheduling response from the second UE, the second scheduling response either accepting or rejecting the second scheduling request.

23. An apparatus for wireless communication of a first user equipment (UE), comprising:
a memory; and
at least one processor coupled to the memory and configured to:
determine a preferred beamforming direction for communications with each of a plurality of neighbor UEs;
generate a first transmission schedule based at least in part on network traffic associated with the first UE and one or more of the plurality of neighbor UEs;
transmit a first scheduling request to a second UE from among the plurality of neighbor UEs, the first scheduling request including the first transmission schedule for a plurality of transmission opportunities (TxOPs), the first transmission schedule indicating a first set of TxOPs of the plurality of TxOPs reserved by the first UE for communication with the second UE; and receive a first scheduling response from the second UE, the first scheduling response indicating whether the second UE accepts or rejects the first scheduling request.

24. The apparatus of claim 23, wherein the at least one processor is further configured to: determine which TxOPs of the plurality of TxOPs are available in the preferred beamforming direction for each of the plurality of neighbor the first transmission schedule being further generated based at least in part on which TxOPs of the plurality of TxOPs are available.

25. The apparatus of claim 23, wherein the first scheduling response rejects the first scheduling request and indicates a set of TxOPs of the plurality of TxOPs reserved for communications between the second UE and a third UE from among the plurality of neighbor UEs, wherein the at least one processor is further configured to:

generate a second transmission schedule by adjusting the first transmission schedule, the second transmission schedule avoiding the set of TxOPs of the plurality of TxOPs reserved for communication between the second UE and the third UE.

26. The apparatus of claim 23, wherein the at least one processor is further configured to:

establish a primary-secondary relationship between the first UE and one or more of the plurality of neighbor UEs.

27. A computer-readable medium storing computer executable of a first user equipment (UE), comprising code to:

determine a preferred beamforming direction for communications with each of a plurality of neighbor UEs;

generate a first transmission schedule based at least in part on network traffic associated with the first UE and one or more of the plurality of neighbor UEs;

transmit a first scheduling request to a second UE from among the plurality of neighbor UEs, the first scheduling request including the first transmission schedule for a plurality of transmission opportunities (TxOPs), the first transmission schedule indicating a first set of TxOPs of the plurality of TxOPs reserved by the first UE for communication with the second UE; and receive a first scheduling response from the second UE, the first scheduling response indicating whether the second UE accepts or rejects the first scheduling request.

* * * * *